(12) United States Patent
Romano et al.

(10) Patent No.: US 10,623,170 B2
(45) Date of Patent: Apr. 14, 2020

(54) COMPLEX SYNTHETIC METHOD AND SYSTEM FOR PHYSICAL AND INFORMATION SIGNAL CANALIZING

(71) Applicants: Francesco Romano, Guidonia (IT); Valerio Romano, Rome (IT)

(72) Inventors: Francesco Romano, Guidonia (IT); Valerio Romano, Rome (IT)

( * ) Notice: Subject to any disclaimer, the term of this patent is extended or adjusted under 35 U.S.C. 154(b) by 0 days.

(21) Appl. No.: 16/072,204

(22) PCT Filed: Jan. 20, 2017

(86) PCT No.: PCT/IT2017/000011
§ 371 (c)(1),
(2) Date: Jul. 24, 2018

(87) PCT Pub. No.: WO2017/134694
PCT Pub. Date: Aug. 10, 2017

(65) Prior Publication Data
US 2019/0036674 A1 Jan. 31, 2019

(30) Foreign Application Priority Data

Feb. 3, 2016 (IT) .................. 102016000011035

(51) Int. Cl.
*H04L 5/02* (2006.01)
*H04J 11/00* (2006.01)
(Continued)

(52) U.S. Cl.
CPC .............. *H04L 5/02* (2013.01); *H04B 1/692* (2013.01); *H04B 1/7093* (2013.01); *H04J 11/00* (2013.01);
(Continued)

(58) Field of Classification Search
CPC ............ H04B 2001/6912; H04B 1/692; H04B 1/7093; H04L 5/02; H04J 11/00
(Continued)

(56) References Cited

U.S. PATENT DOCUMENTS

2006/0208169 A1* 9/2006 Breed .................... B60N 2/002
250/221

FOREIGN PATENT DOCUMENTS

WO 2015067987 5/2015

OTHER PUBLICATIONS

International Search Report and Written Opinion for PCT/IT2017/000011 dated May 17, 2017.
(Continued)

*Primary Examiner* — Leila Malek
(74) *Attorney, Agent, or Firm* — Thomas Horstemeyer, LLP

(57) ABSTRACT

The present invention relates to a complex synthetic system and method, which original input from a plurality of independent non-orthogonal frequency signals with a frequency band not greater than any respective central frequency $f_0$ allows to develop a resulting complex signal with a limited frequency band always not greater than $f_0$, instead of band sum of the respective non-orthogonal independent bands. The resulting complex signal is the linear combination of a plurality of complex orthogonal signals with a limited frequency band less than $f_0$, and each is in bijection with the independent non-orthogonal starting signals.

13 Claims, 17 Drawing Sheets

(51) Int. Cl.
　　*H04B 1/692* (2011.01)
　　*H04B 1/7093* (2011.01)
　　*H04L 25/03* (2006.01)
　　*H04L 27/26* (2006.01)
　　*H04B 1/69* (2011.01)

(52) U.S. Cl.
　　CPC ........ *H04L 25/03343* (2013.01); *H04L 27/26* (2013.01); *H04B 2001/6912* (2013.01); *H04B 2001/6916* (2013.01); *H04B 2001/70935* (2013.01); *H04J 2011/0003* (2013.01); *H04J 2011/0009* (2013.01)

(58) Field of Classification Search
　　USPC .......................................................... 375/316
　　See application file for complete search history.

(56) References Cited

OTHER PUBLICATIONS

Zhu Qibiao et al; "Radio vortex for future wireless broadband communication with high capacity", IEEE Wireless Communications, IEEE Service Center, Piscataway, NJ, US, vol. 22, No. 6, Dec. 1, 2015.

Liu Baiyang et al; "A novel digital transmission method using OAM modes", 2015 Asia-Pacific Microwave Conference (APMC), IEEE, vol. 2, Dec. 6, 2015.

Sjöholm, Johan and Kristoffer Palmer, "Angular Momentum of Electromagnetic Radiation," UPTEC F07 056 Examensarbete, 2007, pp. iii-185.

Tamburini, Fabrizio, et al., "Encoding many channels in the same frequency through radio vorticity: first experimental test," 2011, Venice, Italy.

Allen, L., et al., "Orbital angular momentum of light and the transformation of Laguerre-Gaussian laser modes," Physical Review A, 1992, pp. 8185-8189, vol. 45, No. 11.

Lax, Melvin, et al., "From Maxwell to paraxial wave optics," Physical Review A, 1975, pp. 1365-1370, vol. 11, No. 4.

Rothwell, E. J. and M. J. Cloud, "2.3 Maxwell's equations in moving frames," Electromagnetics, 2001, Sections 2.3-5.4, CRC Press.

Jackson, John David, "Classical Electrodynamics," pp. 12-14, 75-77, 154-186, 240-244, 248-252, 380-383, and 430-434, John Wiley & Sons, Inc.

* cited by examiner

COMPLEX SYNTHETIC METHOD AND SYSTEM FOR PHYSICAL AND INFORMATION SIGNAL CANALIZING

CROSS-REFERENCE TO RELATED APPLICATION

This application is the 35 U.S.C. § 371 national stage application of PCT Application No. PCT/IT2017/000011, filed Jan. 20, 2017, where the PCT claims the priority to and benefit of Italian Patent Application No. 102016000011035, filed Feb. 3, 2016, both of which are herein incorporated by reference in their entireties.

The present invention concerns a complex synthetic channeling and/or energy harvesting method and/or system for canalizing physical & information signals which characterize any occurring physical event.

In particular, this invention focuses on a complex synthetic method/system called Hurricane Spread & Compression System (HSCS).

HSCS allows to develop a resultant complex signal (complex vector), which is the linear combination of a multiplicity of L tri-dimensional (3-D) complex orthogonal signals (where L is an integer number, the value of which is included into an $[1; \infty]$ interval). These orthogonal signals are all correlated to the same $f_0$ frequency. Each l-th of them (where $l=1, \ldots, L$, is the related mode index) occupies a limited required frequency bandwidth $BB_l \leq f_0$.

According to the method envisaged by our invention, each above mentioned orthogonal signal is generated in bijection with the one of the L independent physical signals.

Such independent physical signals are not orthogonal ones but simultaneously occupy overlapping independent frequency bands, $BB_l$.

At the same time, according to our method, each l-th above mentioned orthogonal complex signal is well represented as a linear combination of KM orthogonal complex signals (where K and M are integer numbers, the value of which is included into an $[1; \infty]$ interval, $k=1, \ldots, K$ is the related frequency step index and $m=1, \ldots, M$ is the related azimuth phase step index).

The resultant complex vector composed by the LKM orthogonal signals occupies a limited frequency bandwidth, $BW_{RF} \leq BW_0$, (e.g. $BW_0 = f_0$). The value of the latter equals the maximum one amongst L input signals $BB_l$ with $l=1, \ldots, L$, $BW_{RF} = \max[BB_l]$.

The set of L orthogonal signals generated by the invention univocally characterizes a specific complex algebraic vector space which is a linear combination of 3LM scalar dimensions (3LKM-D) and 3LKM unit vectors.

Consequently, the complex vector space assigned by the method of the invention is an algebraic Hilbert space.

Conversely, in the complex vector space generated according to the invention by the method linear combination of 3LKM scalar dimensions, 3LKM-D, and 3LKM unit vectors, it is always possible to detect each and every L orthogonal complex vectors which the invention method generates in bijection with the same L physical signals.

This way, the invention allows to multiply by L the capacity of the available frequency band. The invention method sets the L value, irrespective of the available frequency band and the central frequency.

Our method also allows to allocate assigned not zero resultant Poynting vector value along propagation axis too. Otherwise the method of invention allows to measure the possible Poynting vector value when different from zero even all along the propagation axis.

It is to be underlined that such performances, which would be impossible to achieve without our invention, increase the efficiency of:
the Transfer channel
the Store space
the Signal
sent out across a link
Radiated towards any natural physical phenomena (i.e., atmospheric or climatic ones or else) in order to create an interference leading to an adequate control action.

BACKGROUND

Techniques earlier our invention only use mono dimensional (1-D) or planar (2-D) vector interferometer methods. For example, in electromagnetic field propagation such former techniques use TEM TE e TM real mode approximation only (see ref. [10]).

As it is well known (ref. [7] [10] [11], in such approximation former systems fail to consider negligible the second time derivatives of electric (E) and magnetic (B) fields phase, as well as the quadratic terms which have been derived by the first time derivatives of both electric (E) and magnetic (B) fields phases; furthermore, they neglect the longitudinal electromagnetic components of the fields themselves.

In former methods, e.g., in those one used for astrophysical observations of weak radiations coming from cosmos bodies, (see ref. [2], [3] e [13]) criticalities like the following ones can be traced:
It is possible to assign or detect the vector or scalar transverse field component only;
In far distance systems, a lot of the radiated energy (information) which is included into longitudinal Orbital Angular Momentum (OAM) components is lost.
Every longitudinal field components are ignored, therefore azimuthal phase ambiguities occur;
Serious destructive interferometric errors occur during detection. The destructive action increases in proportion to the propagation distance as well as to the L value [1], [2] e [3];
Far distance system sensitivity as well as detection of near radiations with very weak transversal components are seriously limited by destructive planar interferometric azimuthal phase errors;
Errors due to detection ambiguity restrict the validity of wave propagation mode approximations.
The value of L maximum quantity of OAM mode is strongly limited by azimuth phase interference.
Further reductions of L quantity of channels occur because of the strong increase in distance, e.g., in satellite communications applications;
The Poynting vector computation value along the longitudinal propagation axis is always equal to zero;
The approximation works for TEM, TE or TM real mode only (ref. [1], [2], [3], [10] and [11]);
As well known in Physics literature the far distance field measurements method is hugely different from the near distance field one.

Scope
The scope of the present invention is:
To find solutions to the problems and criticalities mentioned above;

To improve the Angular Momentum (AnM) and OAM approximation related to the observed wave beam equation complex modes;

To facilitate innovative applications.

Object

Object of the present invention is a method and/or a system, as mentioned in the attached responsibility declarations, which are integrating part of the present description. The present invention concerns physical signals processing.

A generic l-th (with l=1, . . . L) periodical physical signal, is represented by a periodical complex function $SF_l(t)$. $SF_l(t)$ describes a generic natural or artificial physical event in the time-space domain. It is defined in a Euclidean three-dimensional (3-D) space. $SF_l(t)$ arrives at the HSCS input.

Examples of physical events are atomic radiations or acoustic, or climatic, or thermodynamic, or gravitational wave propagation, for example the one coming from any universe black hole, or electromagnetic wave, for example the one coming from the Early Universe etc. . . . events.

The following should be considered indicative only but not restrictive. First, the description of our invention, shows a generalized algebraic model which is valid for every proposed specific invention implementation, and following after it details each of that proposed specific invention implementation.

Each implementation model detailed below is to be considered as an integral part of the basic model and it is also to be considered as necessary to characterize the invention method.

Features and advantages of our invention are highlighted in the detailed description of some implementations provided for in the figures described below:

Figure 1:
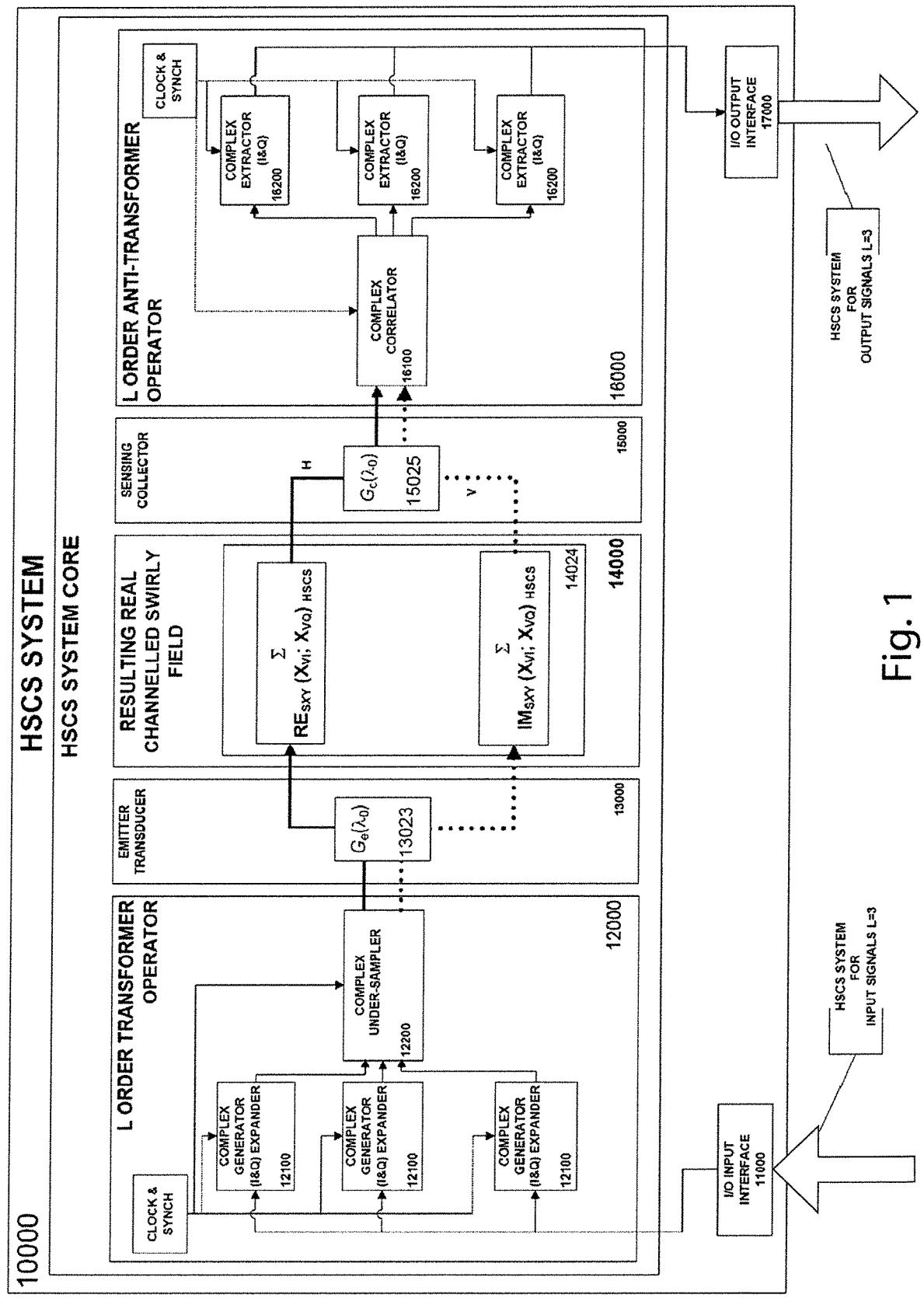
FIG. 1 shows a block diagram of the system operating principle according to our invention. The block diagram points out an invention implementation of the HSCS related to the requested complex vector space generation and/or detection.
Figure 13:
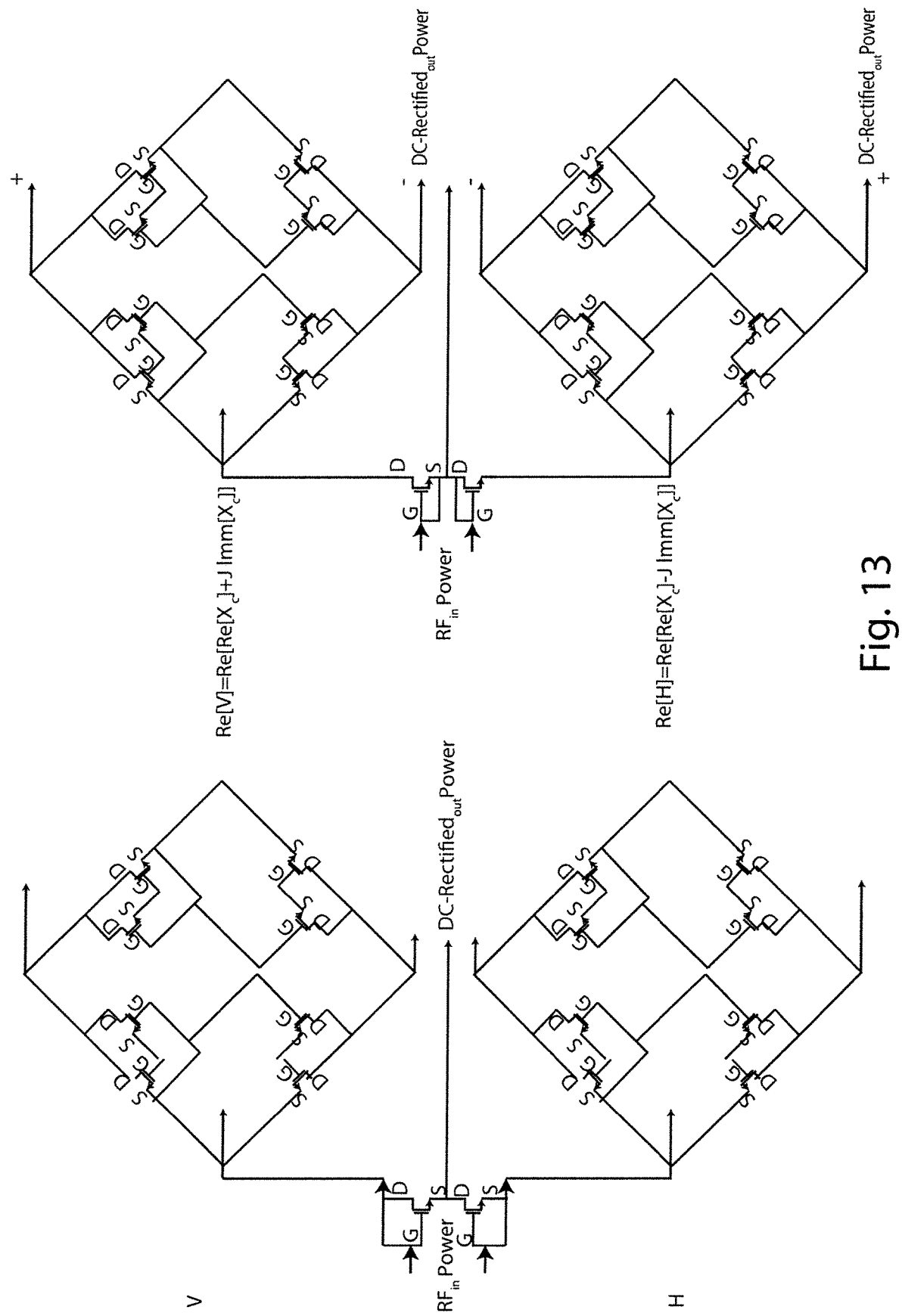

FIG. 13 shows the details of FIG. 1. The block diagram points out tow examples of $HSCS_{LKM}^{-1}$ invention implementations which present two circular polarization Analog wide bandwidth $2^{nd}$ order Power harvesting detector and complex (I and Q) extractor and compressor configurations using a depletion Mosfet bridge in specific Darlington Gate 1 Source 2 as well Gate 2 Source 1 relatives short-circuit configuration.

Figure 14:
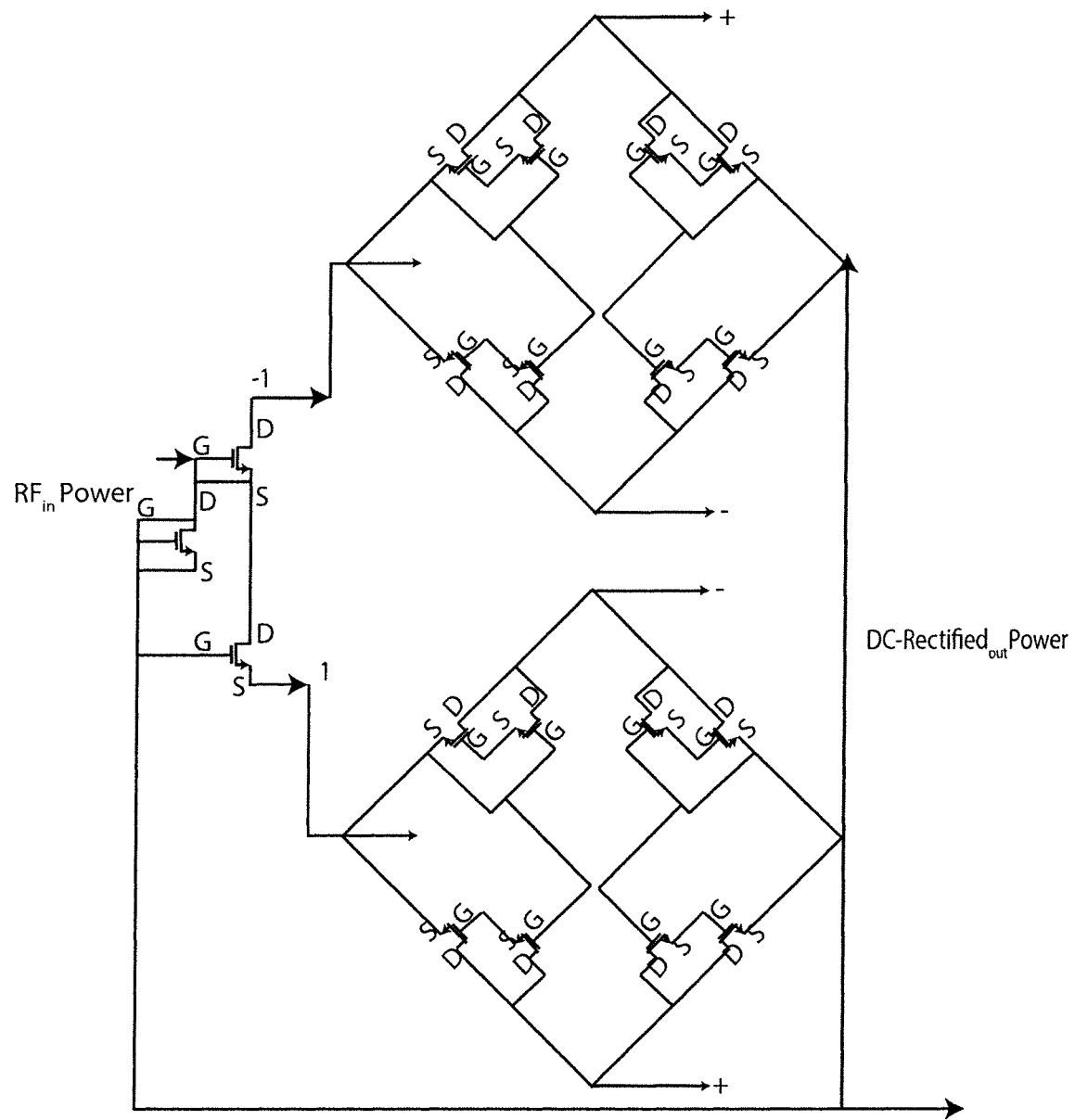

FIG. 14 shows the details of FIG. 1. The block diagram points out an example of $HSCS_{LKM}^{-1}$ invention implementations which present a linear polarization Analog wide bandwidth $2^{nd}$ order Power harvesting detector and complex (I and Q) extractor and compressor configuration using a depletion Mosfet bridge in specific Darlington Gate 1 Source 2 as well Gate 2 Source 1 relatives short-circuit configuration.

Figure 15:
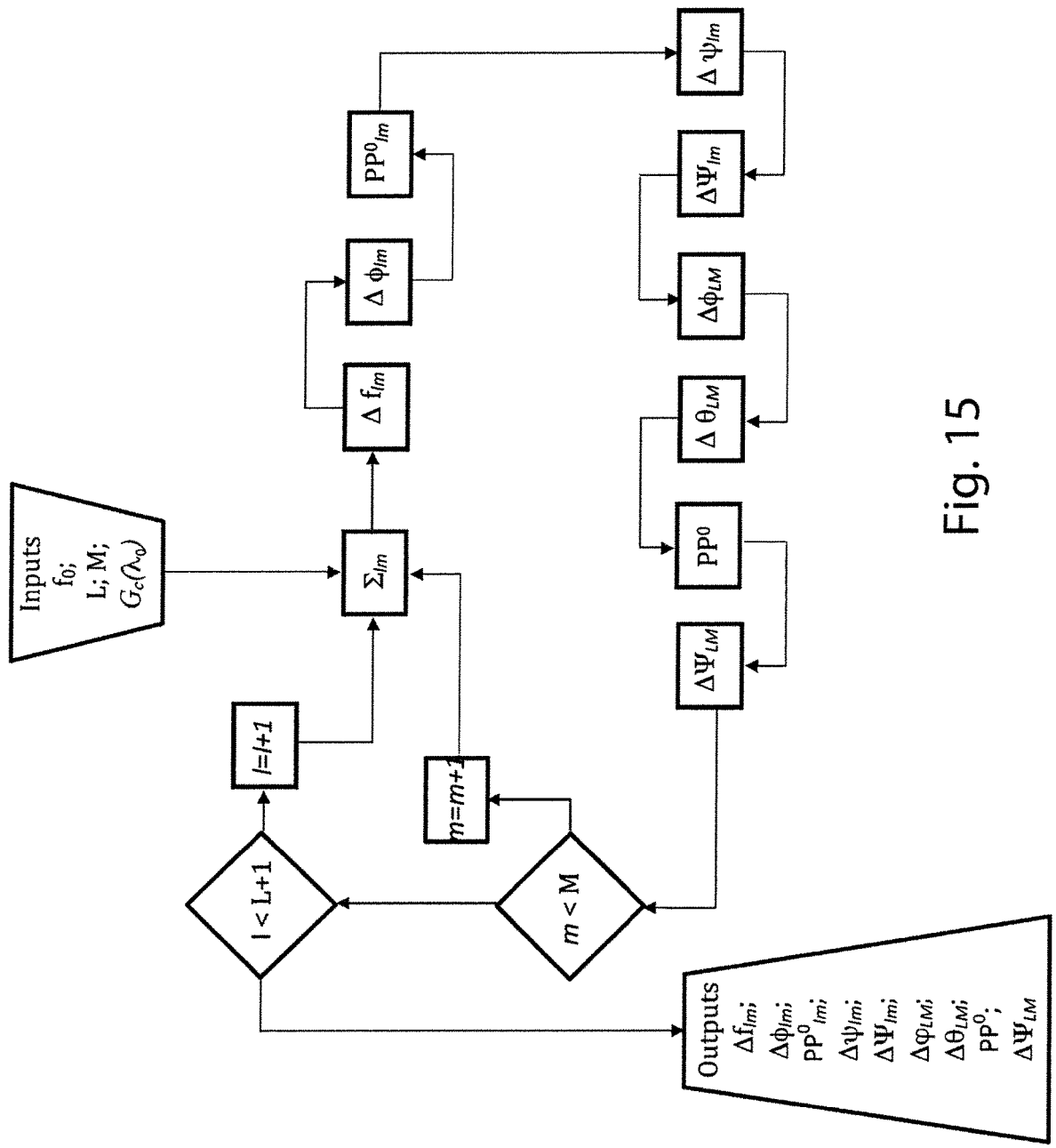

FIG. 15 shows the details of the block diagram of the Matlab (or others) code program which can be used to compute parameters of an HSCS system design as defined by the invention.

Figure 16:
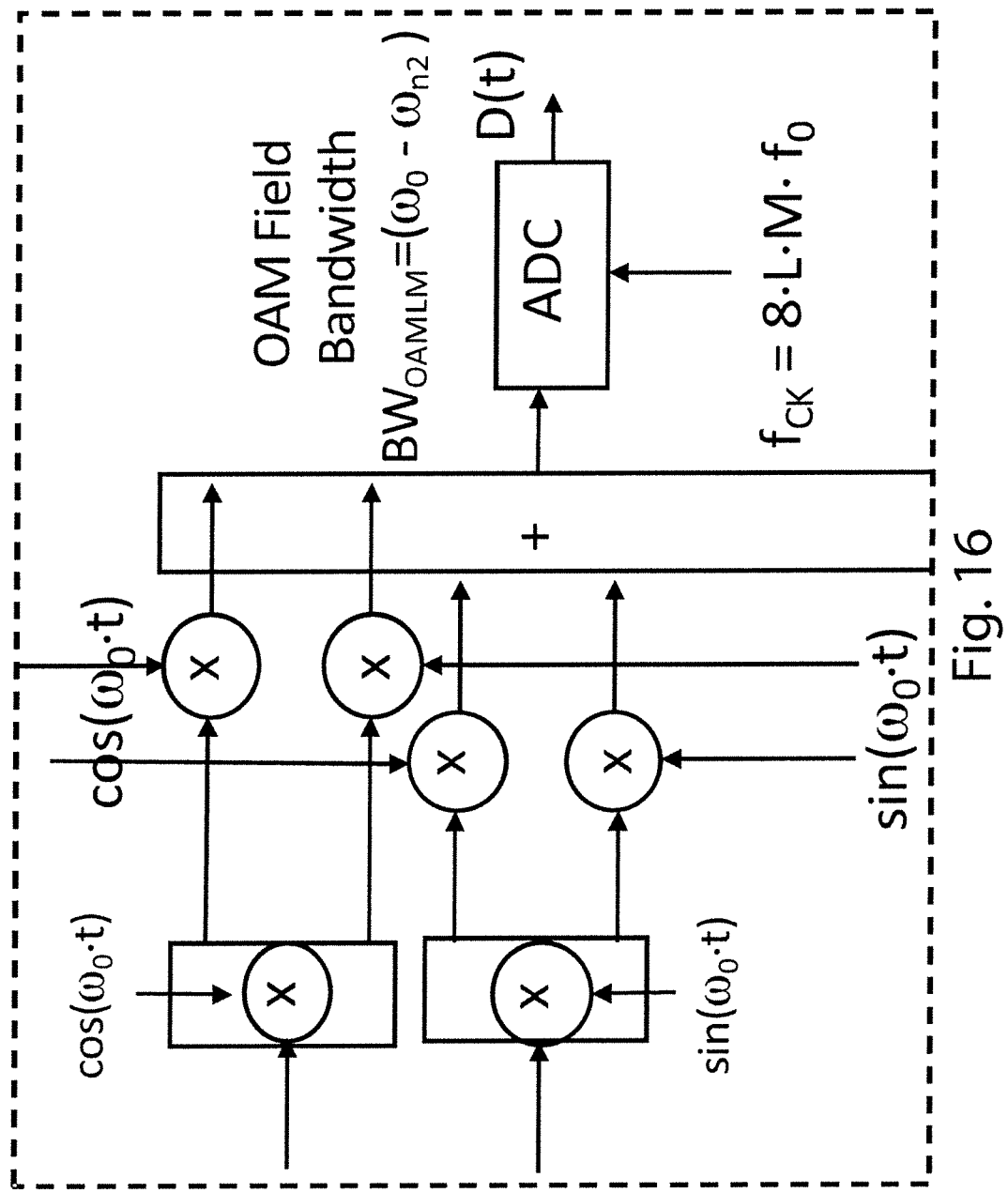

FIG. 16 points out the details of FIG. 15. It is a simplified example of a circular polarized Front End simulator block diagram in a Matlab (or other) code, for the verification of project parameters in a HSCS system according to the invention.

Figure 17:
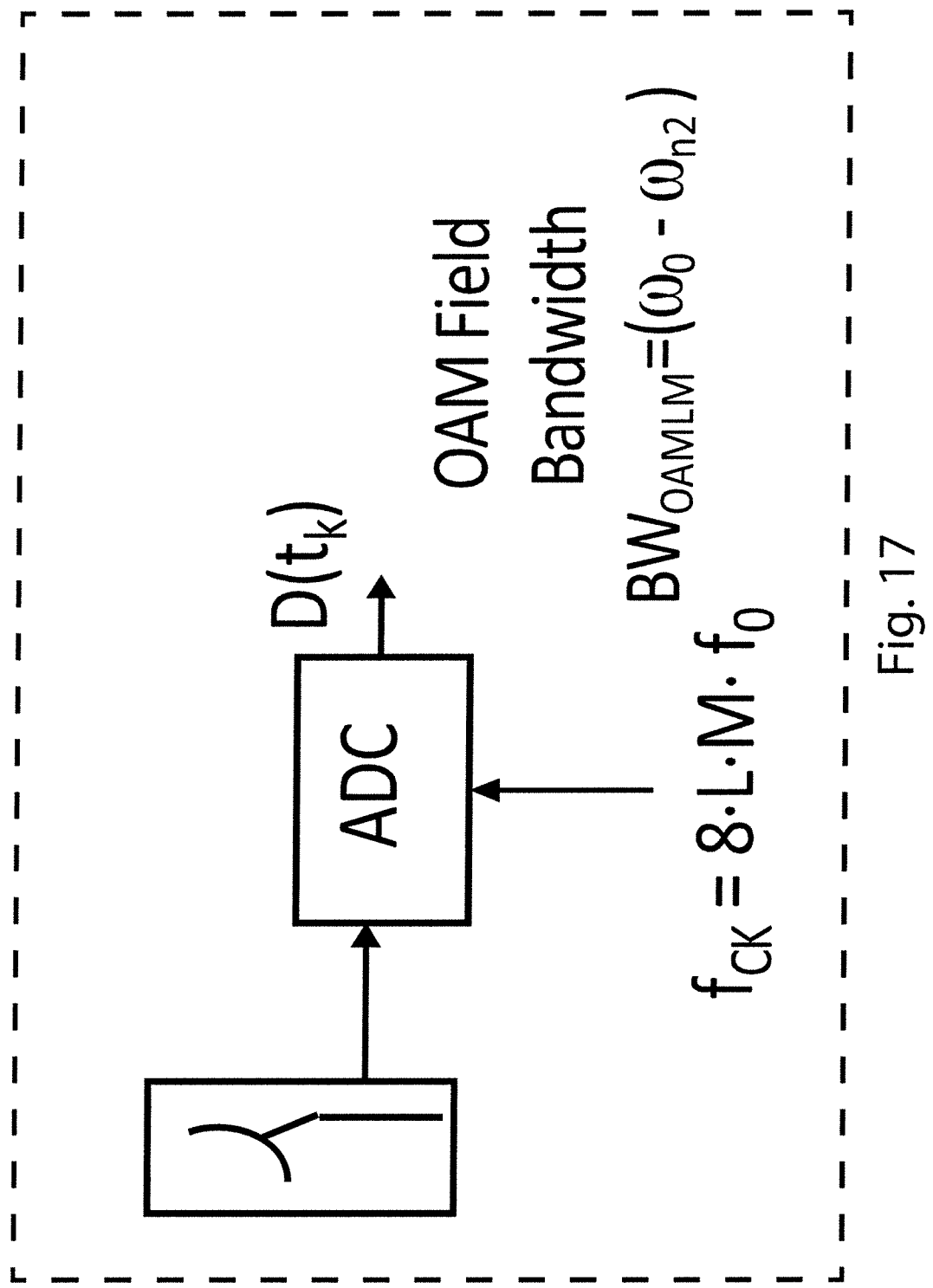

FIG. 17 points out the details of FIG. 15. It is a simplified example of a linear polarized Front End simulator block diagram in a Matlab (or other) code, for the verification of project parameters in a HSCS system according to the invention.

Figure 18:
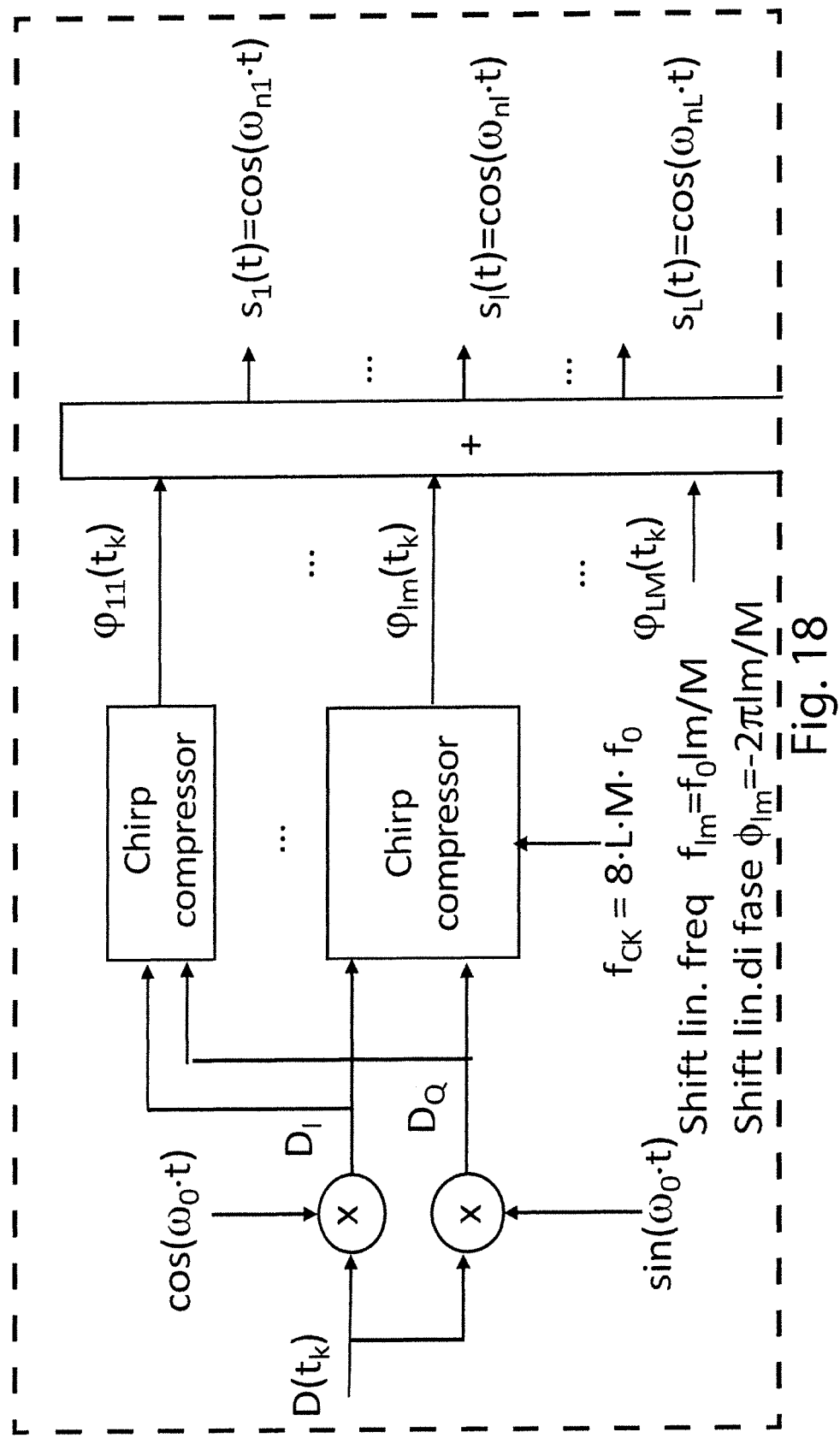

FIG. 18 points out the details of FIG. 15. It is a simplified example of an extractor and compressor simulator block diagram in a Mathlab (or other) code, for the verification of project parameters in a HSCS system according to the invention.

INVENTION DEFINITIONS

The HSCS of the invention system generates a 3LKM-D dimensional algebraic Hilbert space. It is in bijection with a plurality of three-dimensional (3-D) complex vectors which are defined in complex scalar Cartesian (x, y, z) and/or vector Euclidean ($\underline{x}$, $\underline{y}$, $\underline{z}$) space reference systems.

Clearly, such space reference systems are related to scalar ($\phi$, $\theta$, z) and/or vector ($\underline{\phi}$, $\underline{\theta}$, $\underline{z}$) ones, respectively.

Class of Signals in the Invention

Physical signal l-th is a complex periodic function, $SF_l(t)$, which describes the specific time variation of the physical event (natural and artificial alike).

Electric signal, $SE_l(0$, is the output signal from a general transducer. Its variable (in the time and/or frequency domain) is in bijection with the one which pertains to the natural or artificial physical event $SF_l(t)$.

The general l-th independent electric signal, $SE_l(t)$, which transports the contents of information (or energy) to be processed, may appear in the following two algebraic form:

$m_l(t)$: a periodic complex function, where its frequency is $f_{BBl} \leq f_0$ and its frequency bandwidth is $BB_l \leq BW_0$ and index l=1, . . . , L: $m_l(t) = m_l \exp(-j2\pi f_{BBl} t)$.

$SI_l(t)$: a general composed periodic complex function. It is a composed function of $m_l(t)$. $SI_l(t)$ may assume forms two:
1. Polynomial function, composed by R components (where R is an integer number, the value of which is included into an [1; ∞] interval). An FDM signals sequence e.g. each rth Polynomial (where r=1, . . . , R) presents a limited independent frequency bandwidth, $BB_r \leq BB_l$, which is not overlapped and which is consecutive to the other one. The resultant composed by the R Polynomial frequency bandwidths is $BB_l = \Sigma^R_{r=1} BB_r$.
2. Single general modulated function (any modulation, such as digital and/or continuous ones, angular and/or amplitude related ones) with a frequency carrier $f_0$ and a generic $m_l(t)$ modulating signal. In the easiest case, e.g.:

$SI_l(t) = F[m(t); f_0] = m_l \exp[j2\pi(f_0 - f_{BBl})t]$.

Each l-th (where l=1, . . . , N) $SI_l(t)$, electric signal function, has its own $BB_l$ independent frequency bandwidth, Furthermore:

$BB_l \geq f_{Sl} \geq f_{BBl}; \Sigma^L_{l=1} BB_l \leq Lf_0; \Sigma^L_{l=1} \Sigma^M_{m=1} BB_l \leq LMf_0$; and $BW_0 \geq BB_l$.

$S_l(t) = S[m(t); f_0]$ is a complex l-th time function (or $S_l(j\omega)$ in frequency domain) generated by the invention implementation. Its independent and limited frequency bandwidth is $BW_{Sl} \leq BB_l$. Its central frequency is $f_{Sl} \leq f_0$. In the easiest case: $f_{Sl} = f_0 - f_{BBl}$
so that:

$\Sigma^L_{l=1} BW_{Sl} \leq (L)BW_0$ and $\Sigma^L_{l=1} \Sigma^M_{m=1} BW_{Sl} \leq (L)MBW_0$ $S_{lkm}(t) = S[S_l(t); l; k; m]$ is a complex lkm-th function generated by the invention method. It depends on $S_l(t)$ and index l, k, and m. Its independent and limited frequency bandwidth, for example, is $BW_{Slkm} \leq BB_l[(l-1)K+k]m$. Its central frequency is $f_{Slkm} \leq f_0[(l-1)+k/K])$.
In the easiest case: $f_{Slkm} (f_0 - f_{BBl}) [(l-1)+k/K]$ The Invention Concept HSCS system develops a linear combination of L assigned independent not orthogonal functions (or algebraic scalar polynomial functions), $m_l(t)$ (or $SI_l(t)$, in bijection with L spatial (3-D) orthogonal complex vectors functions. All the orthogonal complex vectors generated by the invention method are correlated to the frequency $f_0$.

The HSCS (3-D) orthogonal complex vectors identify an univocal (3-D) complex vector space, which is an algebraic Hilbert space.

The complex vector space assigned frequency bandwidth is $BW_{RF}$ if each of the independent $m_l(t)$ (or $SI_l(t)$) frequency bandwidth $BB_l$ is limited, too.

Each HSCS l-th orthogonal vector generated by the invention is equipped with the same requested temporal phase, $f_0 t$, and an assigned l-th (3-D) specific spherical spatial phase, $\psi_l(lf_0; l\phi)$.

$\psi_l(lf_0; l\phi)$ is assigned by the invention method and is time independent. Once $f_0$ is set, $\psi_l(lf_0; l\phi)$ belongs to the l relative index value only. The invention sets $\psi_l(lf_0; l\phi)$ as composed by a pair of time independent planar phases:

Azimuth phase, the value of which depends on $l\phi$, is included into an [0; L2$\pi$] interval Tilt phase, the value of which depends on $lf_0$, is included into an [−(90°−$\pi$/2L), (90°−$\pi$/2L)] interval Conversely, by the invention method HSCS it is possible to detect the same vector space orthogonal complex vectors (FIG. 8) from any 3-D complex vector space.

Separately or simultaneously HSCS, of the invention, extracts all the required 3-D orthogonal complex vectors which are necessary and sufficient to reconstruct all the required L $m_l(t)$ or $SI_l(t)$.

The operating principle of the invention method is based on the HSCS operator, which is an integral part of the invention as well as a characteristic one of it. According to the invention method, the HSCS is in turn composed by four basic operators, which are described as follows:

$HSCS_{LKM}$ Transform Operators

The transform operator indicated as $HSCS_{LKM}$ (see FIG. 1 block 12000) is an integral as well as a characteristic part of the invention. It is a linear operator. It is defined by the linear combination of all the LKM $S_{lkm}(t)$. $HSCS_{LKM}$ is represented as a linear combination of 3LKM complex orthogonal vectors. Each vector is in turn a linear combination of 3LKM unit vectors. The invention assigns LKM coefficient $C_{LMSlkm}$. Each $C_{LMSlkm}$ is calculated (e.g. by a Matlab code) according to the specific application and the l, k and m index value (data and frequency bandwidth compression/decompression, and/or information or energy canalizing/extraction, etc.). The $HSCS_{LM}$ scalar expression is:

$$HSCS_{LKM} = = \sum_{l=1}^{L} \sum_{k=1}^{K} \sum_{m=1}^{M} S_{lkm}(t) =$$

$$\sum_{l=1}^{L} \sum_{k=1}^{K} \sum_{m=1}^{M} C_{LMSlkm} \exp\{-j[2\pi f_0 t + \psi_{lkm}(lf_0; l\phi; k; m)]\}$$

$G_e(\lambda_O)$ Transducer Operators

The invention transducer operator is defined by its assigned transfer function $G_e(\lambda_O)$.

$G_e(\lambda_O)$ transforms the $HSCS_{LM}$ output in physical signal (see FIG. 1 block 13000). HSCS uses $G_e(\lambda_O)$ to generate the field related to the invention complex vector space. Its implementation depends on the specific invention application. In electromagnetic application, for example, $G_e(\lambda_O)$ represents the transmitter antenna transfer function.

$G_e(\lambda_O)$ Sensor Operators

The invention sensor operator is defined by its assigned transfer function $G_c(\lambda_O)$ $G_c(\lambda_O)$ transforms the physical signal in a specific electrical signal (see FIG. 1 block 15000).

Usually, $G_c(\lambda_O)$ is the inverse of the $G_e(\lambda_O)$ or in many others applications $G_e(\lambda_O) \neq 1/G_e(\lambda_O)$ is possible. Its implementation depends on the specific invention application.

HSCS uses $G_c(\lambda_0)$ to detect simultaneously or separately all the LKM orthogonal complex vectors which are correlated to $f_0$.

$HSCS_{LKM}^{-1}$ Anti-Transform Operators $HSCS_{LM}^{-1}$ anti-transform operator (see block 16000 of FIG. 1), is an integral as well as a characteristic part of the invention. It is a linear operator. It is defined by the inverse linear combination of $HSCS_{LM}$ operator. $HSCS_{LM}^{-1}$ allows to extract simultaneously or separately all the LKM orthogonal complex vectors which are correlated to $f_0$.

$$HSCS_{LKM}^{-1}[HSCS_{LM}] = \Sigma_{l=1}^{L} \Sigma_{k=1}^{K} \Sigma_{m=1}^{M} HSCS_{lkm}^{-1} [S_{lkm}(t)].$$

$HSCS_{LKM}^{-1}$ of the invention reconstructs all the L requested $m_l(t)$ or $SI_l(t)$ independent functions.

Therefore, HSCS of the invention is composed by two different parts which are considered as two separate subsystems:
1. Emitter: $G_e(\lambda_0)*HSCS_{LM} = G_e(\lambda_0)*[\Sigma_{l=1}^{L} \Sigma_{k=1}^{K} \Sigma_{m=1}^{M} S_{lkm}(t)]$, related to an $HSCS_{LM}$ linear transform operator and $G_e(\lambda_0)$ transducer operator process. The subsystem generates a complex vector space (Hilbert space) and a requested related complex field. The subsystem is characterized by a vector complex scalar coefficients 3 LKM× 3LKM matrix. The complex matrix developed by the invention method, e.g. in the electromagnetic case, describes the complex scalar field components amplitude distribution which satisfies the wave equation in the paraxial approximation (see ref. [10]).
2. Collector:
$G_c(\lambda_0)*HSCS_{LKM}^{-1} = G_c(\lambda_0)*HSCS_{LKM}^{-1}$
$[\Sigma_{l=1}^{L} \Sigma_{k=1}^{K} \Sigma_{m=1}^{M} S_{lkm}(t)]$, related to $G_e(\lambda 0)$ sensor operator and $HSCS_{LM}^{-1}$ linear anti-transform. The subsystem detects and extracts the complex orthogonal vector correlated to $f_0$. The subsystem is characterized by a vector complex scalar coefficients 3LKM×3LKM matrix. The matrix of the subsystem, developed by the invention method, is the inverse of the first one above.

OAM Spatial Phase Resultant

OAM spatial phase resultant generated by invention assigned complex vector 3LKM-dimensional space is indicated in the following:

$$\Psi_{LM}(Lf_0;L\phi) = \Psi[\psi_{lkm}(lf_0;l\phi;k;m);L;K;M]$$

Once $f_0$ is set, the invention $\Psi_{LM}(Lf_0; L\phi)$ belongs to the L, K and M parameters values which are assigned by the invention method. $\Psi_{LM}(Lf_0; L\phi)$ is time invariant and is assigned by the invention method.

l-th Harmonic Phase l-th harmonic phase of invention is: $f_l t = l f_0 t$.

Relative Carrier Frequency of the l-th OAM Mode

The relative carrier frequency of the l-th OAM mode is generated by the invention method. It is related to the fundamental frequency $f_0 = 2\pi\omega_0$. It depends on the specific application, $f_0$ and l index. Its expression, e.g. in the simplest case, is:

$$\omega_{RFSl} = \omega_0 - \omega_{BBSl}; \text{ and } d\phi/T_0 = \omega_{RFSl}.$$

Besides, according to the invention method what results is the following:
l-th azimuth phase: $\varphi_{RFSl} = -l\, d\phi$; and $\phi = 2\pi - \varphi_{RFSl}$.
l-th tilt phase: $\theta_{RFSl} = \varphi_{RFSl}/(4l)$; and $\theta = 90° - \theta_{RFSl}$; $d\theta = -\theta_{RFSl}$
channel index: $l = 1/tg\theta_{RFSl}.eb$;normal Development Surrounding of the Invention Three of the possible development surroundings of the invention are considered here. Without excluding any other development surroundings, they are listed below in illustrative but not restrictive way:
1. Physical: natural and/or not natural (artificial) and/or Synthetic (electronics, and/or mechanics, etc. . . . );
2. Theoretical Numerical;
3. Theoretical Algebraic.

Modality of Implementation

The invention implementation modalities are:
Complete system, HSCS (see FIG. 1);
Single independent subsystem, one of two separately:
Emitter: $[HSCS_{LKM}\, G_e(\lambda_0)]$ (see FIG. 3);
Collector: $[G_c(\lambda_0)\, HSCS_{LKM}^{-1}]$ (see FIG. 8).

Typology of Implementation

Five possible typologies of implementation are considered. Each of them is to be considered as an integral part of the invention.

They are identified by their specific level of implementation complexity. The invention method implements each of them by using a different architecture of the HSCS. Each typology allows a different improving factor of the related phase error margin. That phase error margin factor is inversely proportional to the specific level of implementation complexity. They are all feasible and listed below:
a. Continuous chirp and continuous phase. Its implementation complexity level is high. It is valid in every condition, especially suitable in mentioned theoretical algebraic environments applications;
b. Stepped chirp and continuous phase. Its implementation complexity level is more than medium. It is valid in every condition, especially suitable in mentioned theoretical numerical environments applications;
c. Stepped chirp and stepped phase. Its implementation complexity level is optimal. It is valid in every condition, especially suitable in mentioned natural physical environments applications;
d. Stepped frequency and stepped phase. Its implementation complexity level is low. It is valid in every condition, especially suitable in mentioned physical environments applications
e. Analog wide frequency bandwidth. Its implementation complexity level is low. It is valid in every condition, especially suitable in mentioned physical as well as power transferring and energy harvesting and measuring environments applications.

The invention method uses only one functional scheme (see FIG. 1) to implement any of the four typologies highlighted above. The scheme of the invention method consists of seven equivalent functional blocks. The outputs of one block are the inputs of the following one. Each functional block defined by the invention method will be detailed according to the required specific implementation typology.

General Description of Invention Implementation

With reference to the figures, according to the invention, a method is supplied to canalize and transfer a multiplicity of periodical independent physical signals represented by $SF_l(t)$, complex functions in the time domain t, where L is an integer number, the value of which is included into an $[1; \infty]$ interval and $l=1, \ldots L$, each one occupying a $BB_l$, independent frequency band, e.g. $BB_l = [(f_0 - f_{BBl}), f_0]$, Some of such independent signals are e.g.: electrical, electromagnetic, digital and/or analog, mechanical oscillations, pressure waves, optical signals. Starting from these independent signals the invention method generates a single complex signal, which is the resultant signal of L orthogonal components. Each l-th of that orthogonal components is in bijection with the respective $SF_l(t)$. The single complex signal is correlated at a frequency $f_0$ and occupies a single frequency bandwidth equal to $BW_{RF}=\max [BB_l]$, the largest band among said $BB_l$ bands. The invention method performs the following steps:

A. acquiring (11000) the physical signals $SF_l(t)$ and transforming them (11000) into electrical signals by means of one or more transducers;

B. extracting (11000) from each electrical signal of the previous step the relevant information content as modulation function $m_l(t)$;

C. performing (11000) the Fourier Transform of $m_l(t)$, obtaining the function $m_l(j\omega)$;

D. generating (12100), for each modulation function $m_l(j\omega)$, a corresponding periodic digital signal $P_l(j\omega)=S_l(j\omega)$ having carrier frequency $f_0$ and modulation function $m_l(j\omega)$;

E. generating (12100), for each periodic digital signal $P_l(j\omega)$, a pair of signals in quadrature;

F. generating (12100), for each pair of signals in quadrature, mentioned in step E, K*M pairs of signals $PP_{lkm}(j\omega)=S_{lkm}(j\omega)$, where K and M are integer numbers, the value of which is included into an [1; ∞] interval and k=1, . . . , K as well as m=1, . . . , M. Each pair of signals $PP_{lkm}(j\omega)$ is generated through the following steps performed subsequently in any order or at the same time:

performing KM chirp modulations, each characterized by a corresponding frequency increment $\Delta f_{lkm}=[(l-1)+k/K] (f_0-f_{BBl})$ with varying k, in a time interval $\Delta T=T_0$ at a clock frequency $f_c \geq 2LKMf_0$;

performing KM phase linear modulations. Each of K*M phase linear modulations is characterized by a corresponding phase increment $\Delta\phi_{lkm}=-l[1-(K-k)/K] (m/M)2\pi$ with varying k and m, at a clock frequency of e.g. $f_{ck} \geq 2LKMf_0$;

G. under sampling (12200) said pair of signals $PP_{lkm}(j\omega)$ at a frequency $f_0$ thus obtaining a pair of canalized signals $PP^0_{lm}(j\omega)$ which by construction have a spatial phase (3-D) orthogonal to each of the other (L*K*M-1) signal pairs and moreover they are correlated to $f_0$;

H. vector summing (12200) all the L*K*M pairs of orthogonal $PP^0_{lkm}(j\omega)$ components thus obtaining a pair of LKM-dimension signals $PP^0(j\omega)$ occupying band $BW_{RF} \leq f_0$;

I. sending the LKM-dimensional signal $PP^0(j\omega)$ to a signals emitter-transducer (13000) tuned to $f_0$, which performs whatever polarization.

According to the invention, step H mey be also realized by a simple collection node of all the orthogonal signals produced in step G.

According to the invention, steps E and F may be also inverted.

According to the invention, steps E and/or F and/or G and/or H and/or I may be also performed at the same time.

According to the invention, the transducer of step I may be also a signal transmission means with unitary transfer function (e.g. a cable connector).

According to the invention, it is further provided a method for the extraction of a plurality of periodical physical signals represented by complex functions in the time domain t $SF_l(t)$ where L is an integer number the value of which is included into an [1; ∞] interval and l=1, . . . L, each of which occupy an independent frequency band BA (e.g. $BB_l=[(f_0-f_{BBl}), f_0]$), such as electric, electromagnetic, digital, mechanical oscillation, pressure waves optical signals.

The extraction starts from a single signal correlated to a frequency $f_0$ occupying a band whose width is equal to the largest band among said bands $RB_l$, $BW_{RF}=\max[BB_l]$, wherein the following steps are performed:

J. detecting (15000) by means of a sensor tuned to $f_0$, which performs whatever polarization, said complex single signal to obtain $PP^0 (j\omega)=HSCS_{LM}$;

K. applying (16100) a complex correlator, at frequency $f_0$, with a clock frequency $f_{ck}$, to the signal detected by said sensor, thus obtaining LKM pair of signals, $PP^0_{lkm}(j\omega)= HSCS_{LKM}^{-1}(S_{lkm})$;

L. performing (16200), for each one or single one values of l=1, . . . L, KM contemporary convolutions, with a clock frequency $f_{ck}$, of each signal pair $PP^0_{lkm}(j\omega)$, the KM convolutions being configured to extract KM respective chirps with frequency shift $\Delta f_{lkm}=[(l-1)+k/K] f_0-f_{BBl})$ and an azimuth phase delay $\Delta\phi_{lkm}=-l[(K-k)/K] (m/M)2\pi$ in an interval $T_0$ from said signals pair, obtaining corresponding pairs of signals with k=1, . . . K and m=1, . . . M for each l;

M. summing (16200) the KM components of each l value, $PP_l(j\omega)$, obtaining all the independent modulation functions $m_l(j\omega)$ from said single signal with l varying;

N. performing an Fourier Anti-Transform (16100) of $m_l(j\omega)$ and thus obtaining corresponding modulation functions $m_l(t)$;

O. transforming (17000) if required $m_l(t)$ into $SF_l(t)$ by one or more transducer.

According to the invention, said an only signal may be also the signal emitted by said emitter-transducer 13000) of signals tuned to $f_0$, according to any claims 1 to 5.

According to the invention, the polarization of step I may be also the same or is different from the polarization of step J.

According to an aspect of the invention, in step F and/or correspondingly in step L, the value of M and/or K and/or L is infinite, thus obtaining infinite continuous chirps and linear phase modulation Components, wherein the summation is replaced by integral operation.

According to an aspect of the invention, the starting periodic physical signal set is subdivided into a plurality of periodic physical signals, to each element of the plurality being applied the steps of the method.

According to an aspect of the invention, it is provided a computer program, comprising code tools set up in such a way that, when running on said computer, perform steps B to H and/or K to N according to a method of any previous claim.

According to an aspect of the invention, it is provided a system 10000 for the canalization and/or extraction of a plurality of physical signals, wherein the system comprises:

acquisition devices 11000 of a set of original physical signals;

one or more transducers 11000 for the transformation of the original physical signals into electric signals;

a computerized sub-system 12000 to process said electric signals according to steps B to H of the method according to any claims 1 to 5, thus obtaining one or more final electric signals;

one or more transducers 13000 for the transformation of said final electric signals into final physical signals;

emission devices 13000 for the emission of said one or more final physical signals; and/or sensors 15000 for the acquisition of said one or more final physical signals;

one or more transducers 15000 for the transformation of physical signals into electric signals;

a computerized sub-system 16000 for processing said electric signals according to steps K to N of the method according the invention, obtaining one or more electric signals;

one or more transducers 17000 for obtaining said original physical systems from said electric signals.

Description of an Implementation of the Generalized Algebraic Model According to the Invention The following implementation example can be applied in the most general case (therefore in all a, b, c, d, e, cases already described). Such invention implementation is specifically best for the more complex case of theoretical algebraic Continuous Spectrum (Continuous Chirp-Continuous Phase, already mentioned as "a" case).

Actually its implementation requires a greater processes' precision and reiteration technological level than the other four cases (b, c, d and e) according to requested approximation degree.

Once the following values have been fixed:

$f_0$;

$f_{RFl}$, the l-th carrier (e.g. in the easiest case: at $f_{RFl}=f_0-f_{BBl}$);

L, the number of components

LKM, phase steps [e.g. the easiest case, with K=1, phase steps varying value: from 0 to $\pm L2\pi$ (azimuth); from 0 to $\pm(n/2-7e2L)$ (Tilt)].

the spatial coefficients and the parameters related to the project are assigned, according to the invention, also using e.g. the already mentioned Matlab Code as a programming tool which is described in the following.

Input Interface 11000 of FIG. 1

Figure 2:
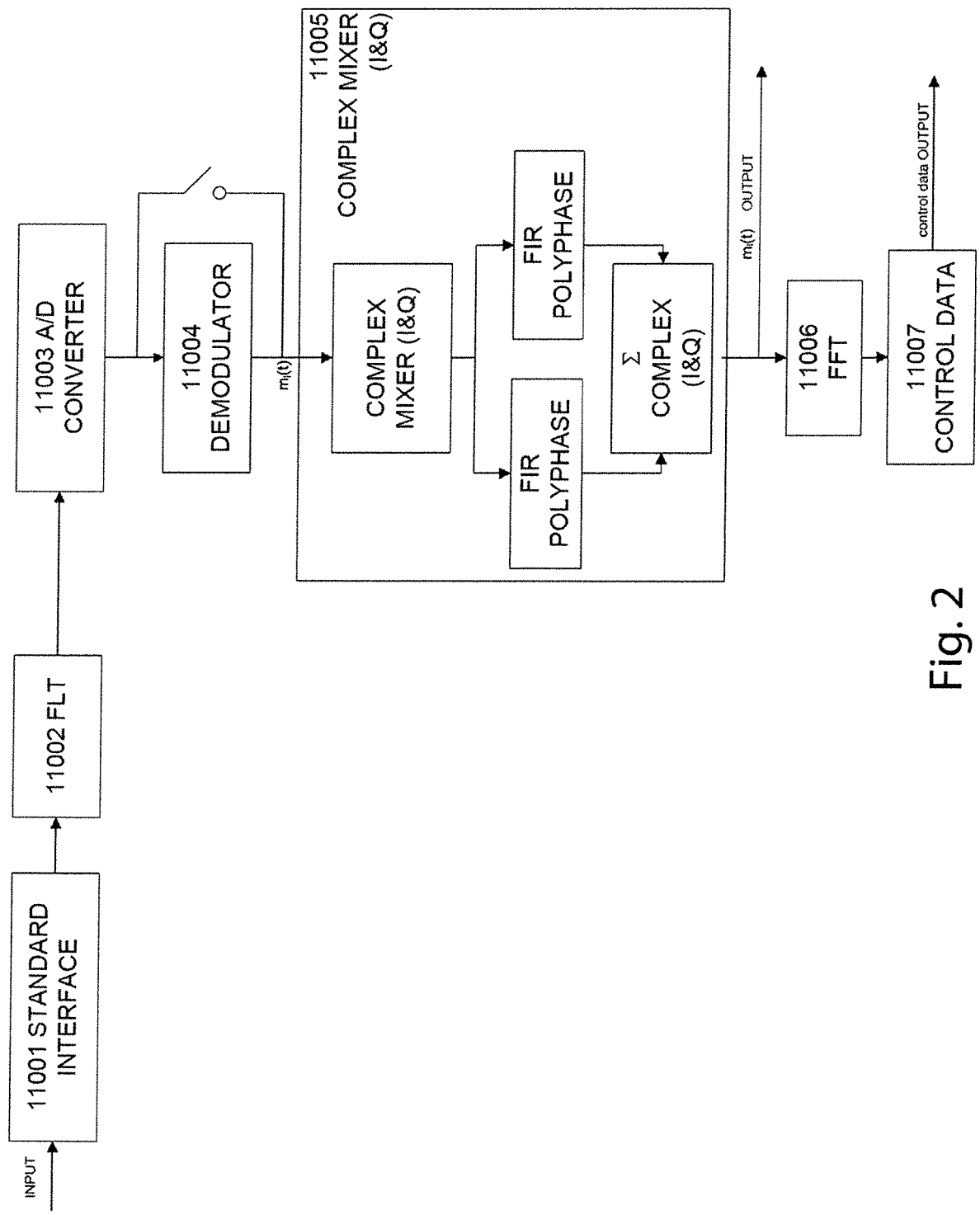
FIG. 2 shows the details of a block diagram implementing the specific I/O input interfaces in the HSCS system. The block diagram points out an invention implementation which presents the signal data and "control data" generator.

Here we refer to the flow diagram in FIG. 2 that illustrates a 10000 system portion implementation example according to the invention.

The generic signal $m_l(t)=m_l \exp(j2\pi f_{BBl}t)$, or $SI_l(t)$ as an alternative, reaches the input of a standard interface 11001. After being filtered by the anti-alias Polyphase one of 11002 block, the signal is sent to the sampler of 11003 block which could be a Serial Digital to Digital or an Analog to Digital standard converter, at a frequency rate of $f=f_{CK}$. The frequency rate of the example has been set to $f_{CK} \geq 2LKMf_0$. The output of 11003 block is sampled and, in case conveniently de-modulated by 11004 block. The output of 11004 reaches the entry of the optional stage 11005. The 11005 output, corresponding to complex vector $m_l(t)=m_l \exp[j(2\pi f_{BBl}t)]$ sampled at $f_{CK}$, is the output of this process phase of the invention.

Optionally, this output can be further processed by a 11006 FFT stage to extract the data related to the $m_l(t)$ message frequency spectrum. The aim of this optional process is to generate control data to be sent in cascade to a standard controller of 11007 block.

The 11007 controller puts the "Register control data" into a proper digital format. Each specific lkm-th "Register control data" is conveniently transmitted to the lkm-th related register of the successive stage (12108 block of FIG. 4).

Expander (I & Q) Complex Generator 12100 of FIG. 1

Figure 3:
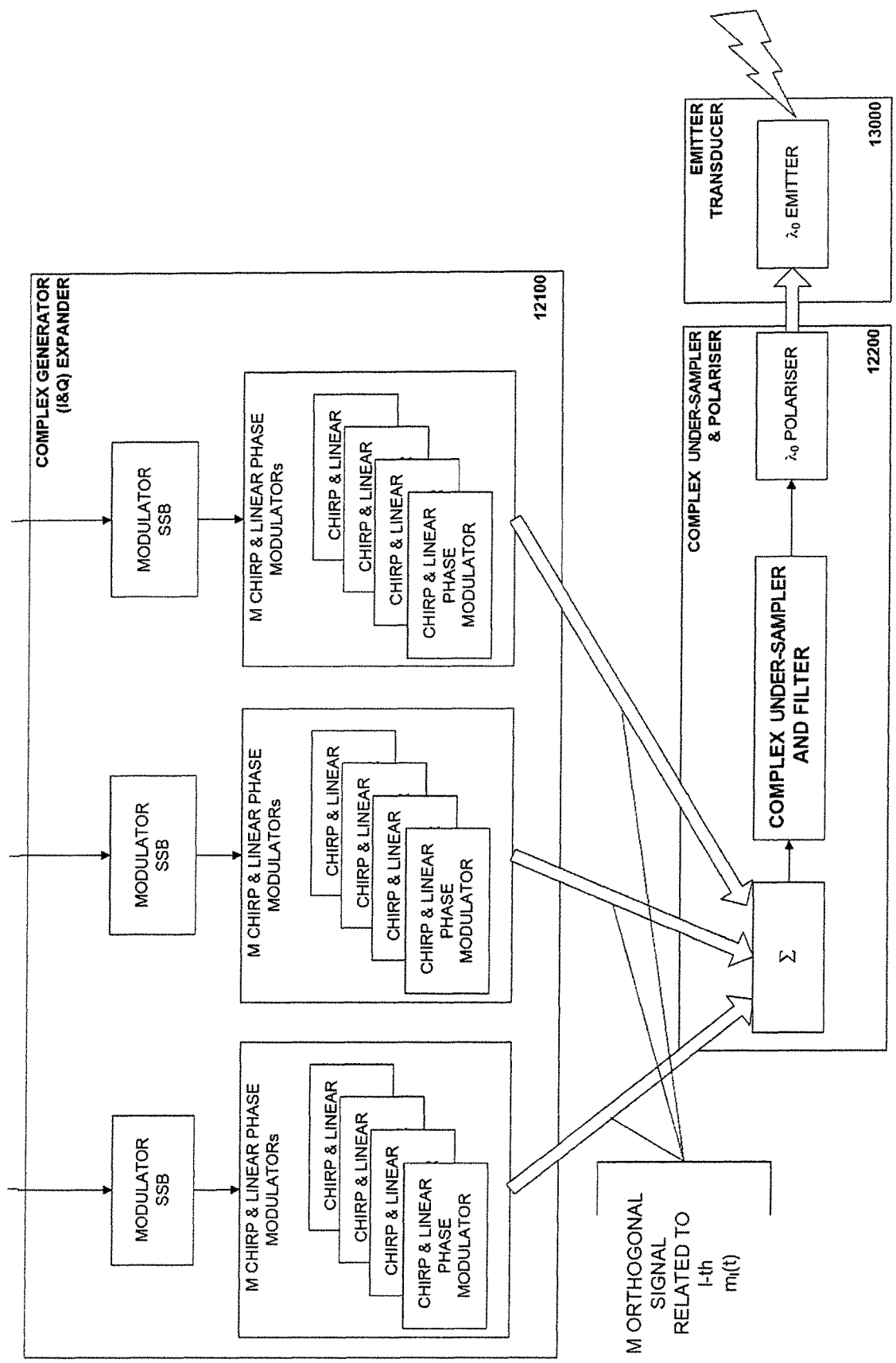
FIG. 3 shows the details of the operating principle diagram of the OAM transmitter modulator described in FIG. 1. The block diagram points out an invention implementation of the chirp and shifted linear phase modulators with L=3, K=1 and M=4.

System generator is implemented in this case with a bench of L*K*M direct digital synthesis (D.D.S.) generator devices (see the implementation block diagram of FIG. 3 where L=3, K=1, L=4).

Figure 4:
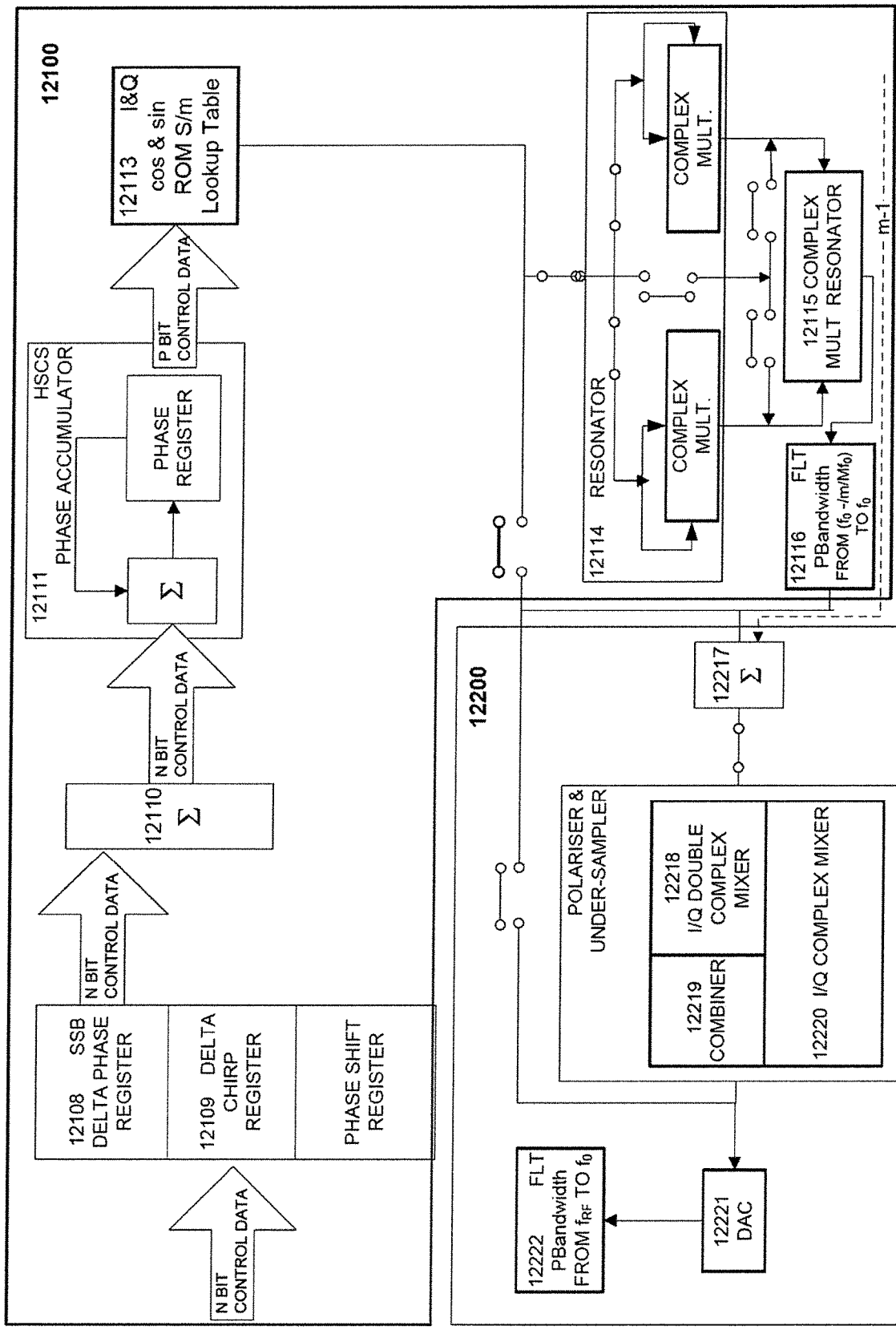
FIG. 4 shows a detail of FIG. 3. The block diagram points out an invention implementation which presents the complex (I and Q) generator (e.g. in the specific case: with a single side band signal, SSB, as carrier), the under-sampler and transducer, related to the lkm-th signal synthesis in the specific case, "a": continuous chirp-continuous phase.

FIG. 4 shows a specific detailed development of a lkm-th single elementary DDS generator.

The lkm-th "Register control data", related to the $m_l(t)$ signal, obtained as output of 11007 block of FIG. 2, go into 12108 register of FIG. 4, dedicated to the carrier, $S_l(t)$, specific information (e.g., "SSB delta phase") in the corresponding DDS having l, k and m indexes. The lkm-th "Register control data" is requested to digital synthesize the carrier signal, $S_l(t)$, with an assigned frequency $f_{RFl}$. Each of the 12100 generators (see FIG. 3) is realized as a D.D.S. and it is highlighted in FIG. 4. The l-th control data corresponding to the $m_l(t)$ signal, coming from the input interface, entering the HSCS system invention, is essential to digitally synthesize the $S_l(t)$ signal having $f_0$ carrier and $m_l(t)$ modulating, with any appropriate modulation required, according to the specific application of the invention (in the example here the single side band, SSB is considered).

The "Register control data" designated to the specific information of the "SSB delta phase", assigned by the invention, and contained in the 12108 block, enter the combiner, 12110 block of FIG. 4. Therefore 12110 block provides the data related to the instant incremental phase value of $S_l(t)$ that are to be sent to 12111 block, which is a phase accumulator. The 12111 block output data enter the 12113 block which includes an algebraic structure (lookup table) originating the I and Q pair (see FIG. 4) of the SSB signal digital direct synthesis associated to $m_l(t)$.

Then, each element of the I & Q pair is auto-correlated by a first resonant stage 12114, having a multiplier tuned to $f_{RF}$ as algebraic model. This tuned multiplier is built by a couple of synchronous digital resonators put in parallel and $f_0$ correlated (at least for a small phase error of $\varepsilon$ proportional to $\omega_{BBl}/\omega_0$). Those synchronous digital resonators work simultaneously, at the same temporal and angular conditions, and on the same signal $m_l(t)$) linked.

The two I and Q pairs out bounding the 12114 block are respectively represented by two synchronized polynomials. Those synchronized polynomials identify an infinite number of simultaneous intermodulation products related to the same typical single carrier frequency $f=f_{RF} \forall m_l(t)$ (having a small proportional phase error less than the corresponding $\omega_{Sl}/\omega_0$). The two I and Q pairs enter the second "resonant" 12115 stage. This second "resonant" 12115 stage has an algebraic model of a multiplier. Inside the 12115 stage, each simultaneous component related to each of the two input sequences, is modulated by each of the identical and simultaneous components of the other one sequence present there.

The I and Q pair output from 12115 block enters a digital low-pass filter FIR 12116 having $f_{-1\,dB}=(f_0-f_{BBl})[(l-1)+k/K]$. The low-pass filter FIR 12116 is in charge of harmonic suppressing having $f>(f_0-f_{BBl})[(l-1)+k/K]$ frequency, which is typical of the l-th sequence couple I and Q.

Complex Under-Sampler 12200 of FIG. 1

The output sequence pair (I and Q) of 12216 block of FIG. 4 are added and under-sampled through a sequence of two blocks in cascade:

Sum that performs a vector addition (12217 block) of all the LKM pairs outgoing from the filters (12216 block) in a 3-D complex space;

A digital $f_0$ multiplier (or mixer) that uses a complex correlation $f_0$ based, to assign the polarity to 12216 block output signal. Depending on the polarization to be assigned, the polarization can be implemented in two different manners.

1. A cylindrical structure having a circular, or even elliptic, polarization (with typical complex Divergent mode).

Here a 12218 block complex double mixer (one cos $f_0t$, and the other sin $f_0t$) generates two quadrature outputs, for each I and Q. These output signal pairs have been generated with a general complex vertical and horizontal polarization, designated as $x^{VI}$ and $x^{HI}$ (for I) and as $x^{VQ}$ and $x^{HQ}$ (for Q), each respectively with cos $f_0 t$ or sin $f_0 t$ carrier.

Combiner, 12219 block, follows in cascade, and performs separately two vector additions in a 3-D space. It follows that, those two resultants vectors (V and H respectively indicated) are both correlated to the $f_0$ carrier, and each in quadrature (90° out of phase) to the other one:
The one V as: $x^{VI} + x^{VQ}$
The other H as: $x^{HI} + x^{HQ}$.

2. A linear polarization (with typical complex Non-TEM mode).

In this case, each of all the LKM pairs outgoing from the previous 12217 stage, is sent to the 12220 block. Here the LKM components are, first of all, respectively correlated with a $f_0$ frequency by two quadrature digital complex mixer (one cos $f_0 t$, and the other sen$f_0 t$). The respective output components of the two mixers are here in-phase. Because they are orthogonal too, then here they are one to each other added and correlated with a $f_0$ frequency.

Optionally this purpose is implemented by 13023 block of FIG. 1. Such purpose, e.g. in the electromagnetic transmission system, which performs a linear polarization field, is carried out by a simple $\lambda_0$ tuned antenna. In this case 12220 stage is skipped and does not participate to the invention process. Furthermore, the block 12217 can be just realized by sending every of the 12116 outputs (each one orthogonal to the other) directly to the 12218 or 12220 stage's entries: then stage 12117 becomes merely functional symbol.

Optionally, each of the LKM output components outgoing from 12119 or 12120 blocks, enter in a D/A converter (12221) (in case an Analogic field to be generated is required). Output 12221 block is the input of 12222 block, a low-pass or a pass-bandwidth filter (also optional). In the example explained here, it is a pass-bandwidth filter $BW_{HSCS} = BW_{RF}$ in charge of letting go each orthogonal component overlapping in the $BW_0$ band.

Emitter Transducer 13000 FIG. 1

For simplicity, here in the most general case, it is an Operator that, based on the polarity whatever assigned (linear, circular or even elliptic) by the previous stage, generates the algebraic field depending on each I and Q pair outputs from 12119 or 12120 preceding stages (see FIG. 3-4).

The output signal from 12222 block enters 13023 block. This block provides a transfer faction equal to $G_e(\lambda_0)$ already described.

Actually, the transducer is optional: for the easiest case like a data transfer over a data network (wired network) the transducer might not be used. The equivalent is obtained setting the transferring functions=1 ($G_e(\lambda_0) = G_c(\lambda_0) = 1$).

Field, 14000 of FIG. 1

13023 block output is an algebraic expression representing a field that occupies a $BW_0$ bandwidth allocated by $HSCS_{LKM}$, in an infinite complex 3-D space.

Optionally the output from 13023 block (see FIG. 1) enters a combiner 14024 block (see FIG. 1). 13023 block executes a sum of $HSCS_{LKM}$ generated field and all the vector elements belonging to other different complex vector spaces, that is with all the possible algebraic elements, within or outside the $BW_0$ frequency bandwidth, existing in the same complex infinite 3-D space.

Collector Sensor 15000 of FIG. 1

This Collector Sensor performs the inverse transducer 13000 block operation and it fulfills the role of a sensor (15025 block in FIG. 1). It is implemented according to the field polarization and it is characterized by a transfer function $G_c(\lambda_0)$ already described. It reveals each of the LKM 3-D orthogonal vectors of the complex vector space assigned by $HSCS_{LM}$ together with any other different vector space signal existing on its input, and correlates them to a $f_0$ frequency.

All those complex 3-D modes occupy the same assigned bandwidth $BW_0$ defined by the frequencies falling in the interval (e.g. here $f = [(f_0 - f_{BW_0}), f_0]$, and all are $f_0$ correlated.

The sensor, like the transducer above, is actually optional. In effect, in the easiest case of a simple data transfer over a data network (e.g.: wired network), the sensor is not needed. This is the same as putting the sensor and transducer transfer functions to 1 ($G_e(\lambda_0) = G_c(\lambda_0) = 1$).

Complex Extractor 16000 of FIG. 1, $HSCS_{LM}^{-1}$

Figure 8:
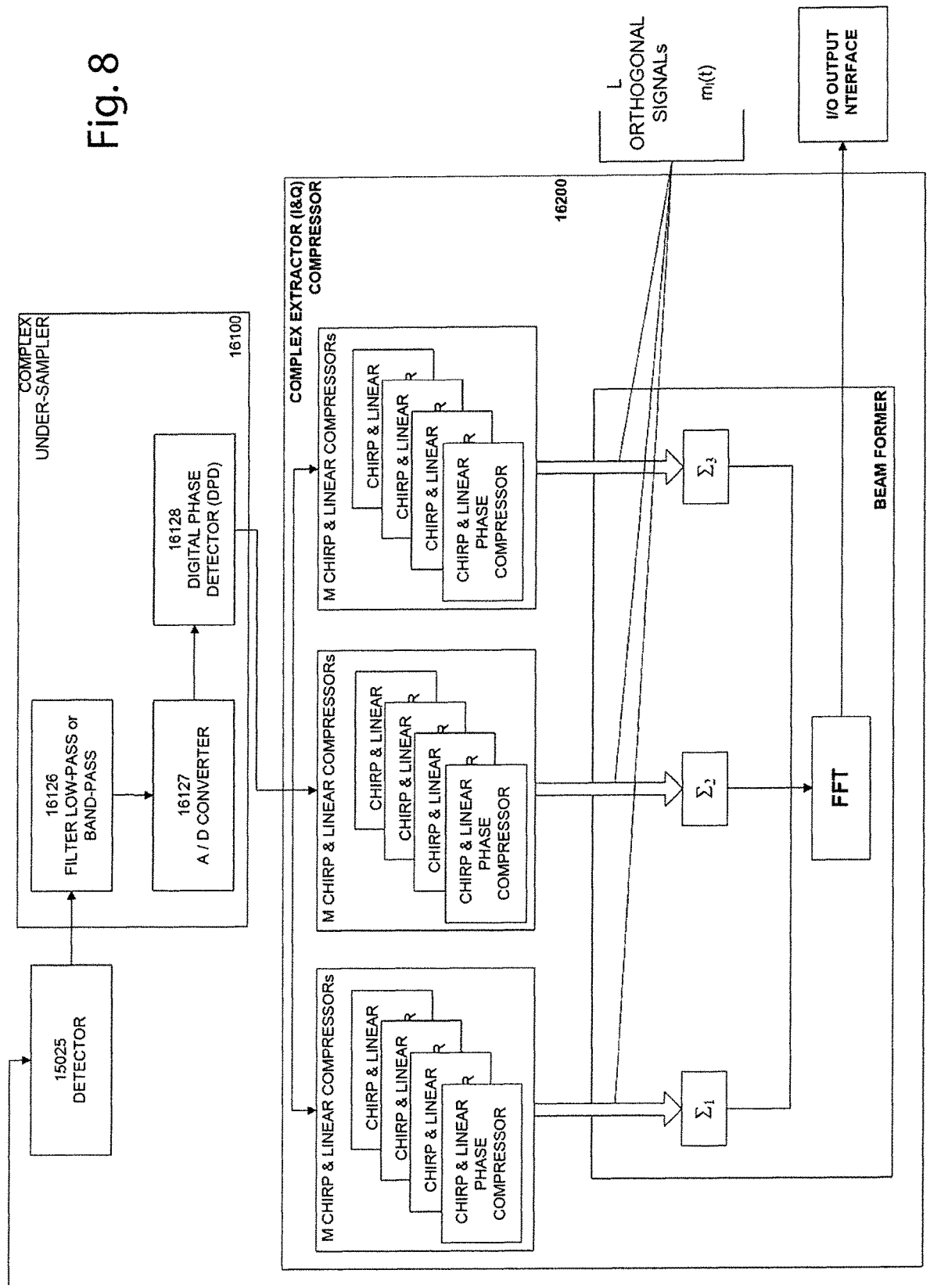
FIG. 8 shows the details of FIG. 1. The block diagram points out an invention implementation which presents the detector, the complex (I and Q) extractor, the under-sampler $HSCS_{LM}^{-1}$ and the output interface, with L=3, K=1 and M=4.
Figure 9:
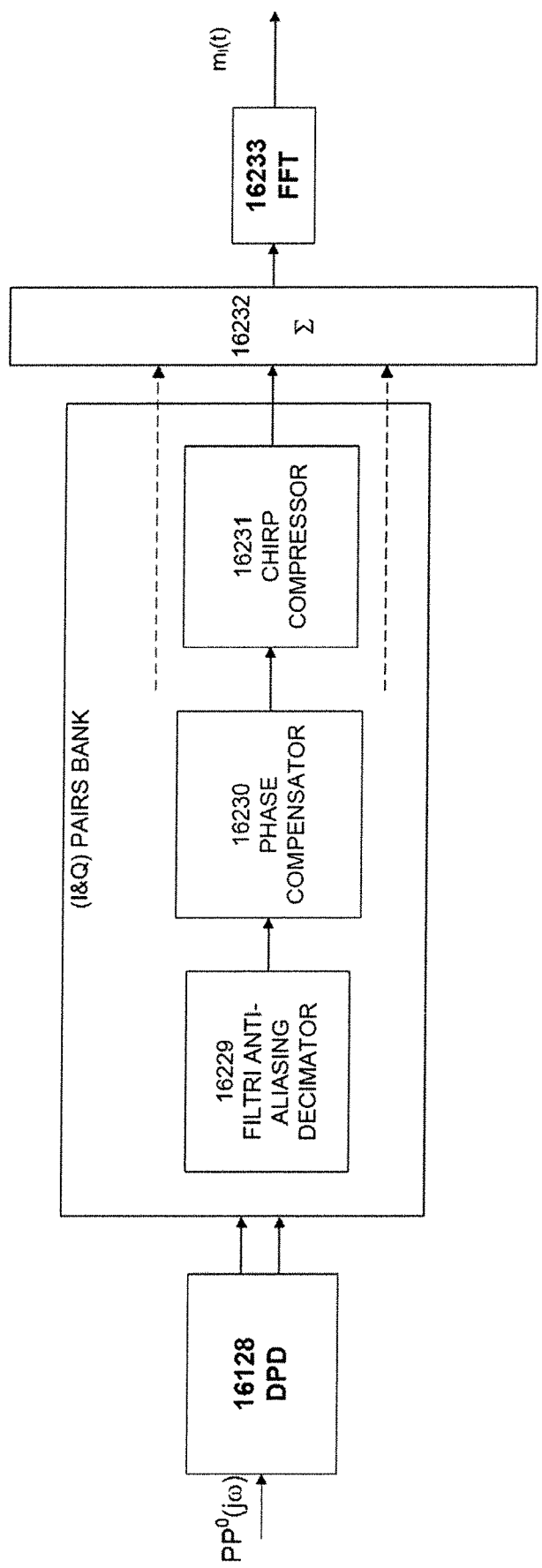
FIG. 9 shows the details of block diagram of FIG. 8, the implementation related to the/km-th signal in all cases (a, b, c, d). The block diagram points out an invention implementation which presents the digital phase detector (DPD) and the extractor.

Here the activated L modes $HSCS_{LM}$ are extracted (individually or simultaneously according to the invention implementations) from any point of the field and at every t instant. Each l-th linear combination can be continuous or discrete, depending on application cases. Each l-th linear combination is represented by a complex periodic vector algebraic expression $\omega_0$ correlated, and it is composed by 3LKM orthogonal vectors having 3LKM unit-vectors. Referring to FIGS. 1, 8 and 9 an invention implementation is described as follows.

Optionally, a proper filter (16126 block of FIG. 8) selects the components coming out from 15025 block (of FIG. 1 or 8). This filter selects the frequencies included in the bandwidth interval, $\Delta f = [(f_0 - f_{BW_0}), 1 f_0]$, in the event of a single l-th mode is of interest.

In case all the L modes together are the matter of interest, then the optional filter will be a low-pass one, in order to select the frequencies contained in the $[0, Lf_0]$ interval. It is not needed, and can be skipped, in case of a data transfer on a digital data network.

The output signal of 16126 block in FIG. 8, is then converted into a Digital one by a single large bandwidth Sampler (16127 block of FIG. 8) having a proper clock frequency (in the example here $f_{ck} \geq 2LKMf_0$). This stage is optional, and it is inserted only in the event of an Analogic input.

Then, this stage sends the samples to 16128 stage (see FIGS. 8 and 9) which is a complex mixer (I e Q). The Digital Phase Detector (DPD) 16128 (see FIG. 8 or FIG. 9) detects the phase of each one of the input LKM samples, having a $f_{CK}$ (or optionally a $f_0$) frequency. The DPD translates each lkm-th sample to the corresponding central frequency of $f_{Slkm} = [(l-1) + k/K] f_0$. The DPD phase error is equal to an ε as small as requested (programmable) and proportional to the corresponding ratio $\omega_{Sklm}/\omega_{ck}$.

The output signal (I e Q) is sent to a LKM Polyphase filters bank. Each LKM filter is built by three stages in cascade that works at a frequency clock of $f_{ck}$:

16229 block of FIG. 9 has a function of properly decimating each lkm-th component of the signal;

16230 stage that introduces a specific incremental azimuthal phase delay $l [1-(K-k)/K] (m/M)2\pi$ on each orthogonal lkm-th signal;

16231 block produces a chirp compression with a assigned slope of $\mu = \pi[(l-1)+k/K]f_0/T_0$, and defined pulsed response.

The last two cascade blocks (16230 e 16231) together realize a convolution (matched Filter) that selects each lkm-th component of the orthogonal LKM ones. The sequence order of these stages can be optionally changed.

The LKM Polyphase filters bank can be realized merging the 16229, 16230 and 16231 stages in a single decimation—compressor bank made up of one Polyphase filter that processes the LKM modes together (all or some of them).

The 16231 outputs are then combined by L combiners 16232 (optionally only 1), grouping them conveniently based on the corresponding l, k and m indexes. Each combiner sums the related KM outputs, having l index, to rebuild the l-th signal $m_l(t)$ used as the input of 16233 stage. 16233 stage is a bank that executes a Fourier transform, FFT. Here (FIG. 9) all the L $m_l(t)$ are finally rebuilt (individually or simultaneously) in a digital requested format.

The L combiners 16232 stages can be integrated with the FFT bank 16233 to realize a single bank Output Interface 17000 of FIG. 1

The output interface 17000 transforms at a frequency of $f_{CK}$, with a process corresponding to the one described above for the 11000 blocks of FIG. 1.

Figure 10:
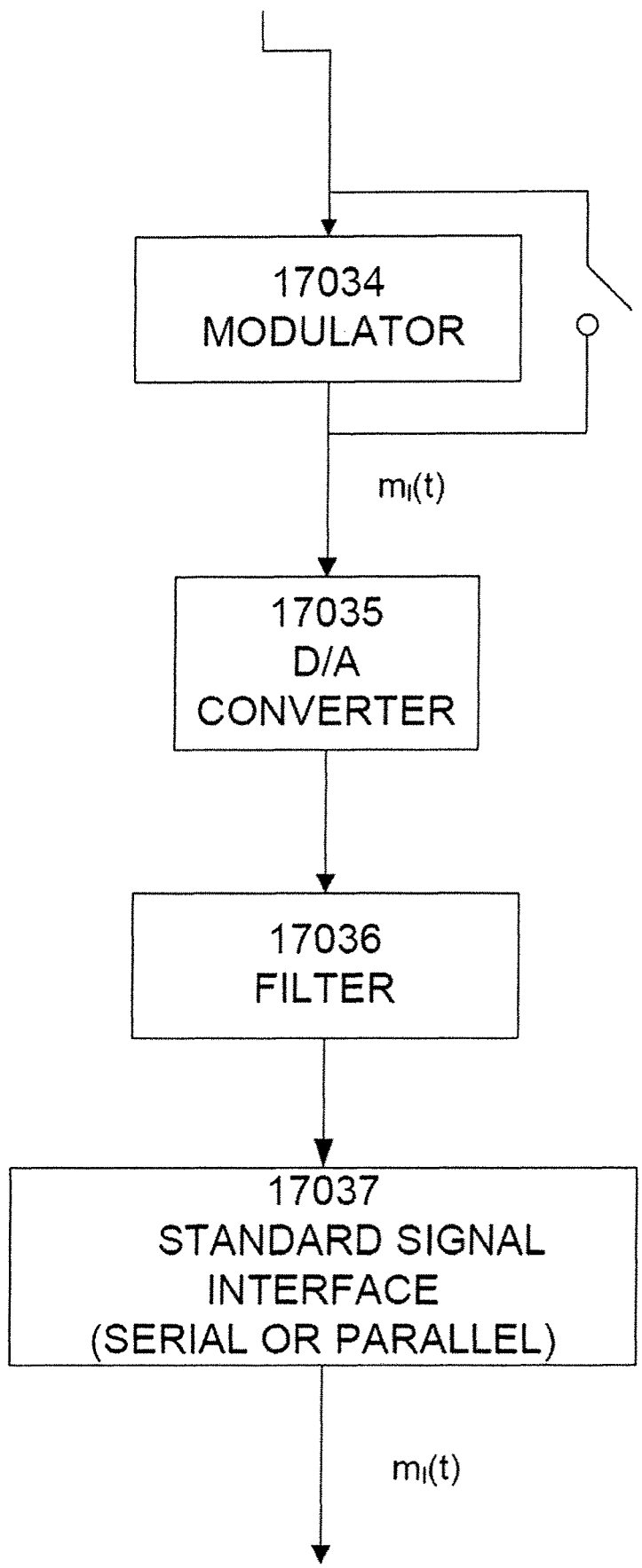
FIG. 10 shows the details of the block diagram of the specific HSCS I/O interface as defined by the invention.
Figure 11:
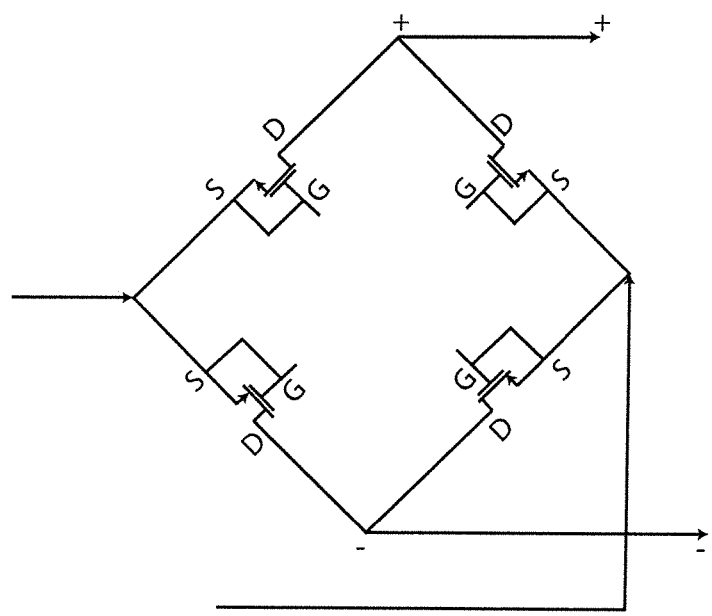
FIG. 11 shows the details of FIG. 1. The block diagram points out the example of an invention implementation which presents the Analog wide bandwidth $2^{nd}$ order Power harvesting detector and complex (I and Q) extractor and compressor, using a depletion Mosfet bridge in specific Gate Source short-circuit configuration.
Figure 12:
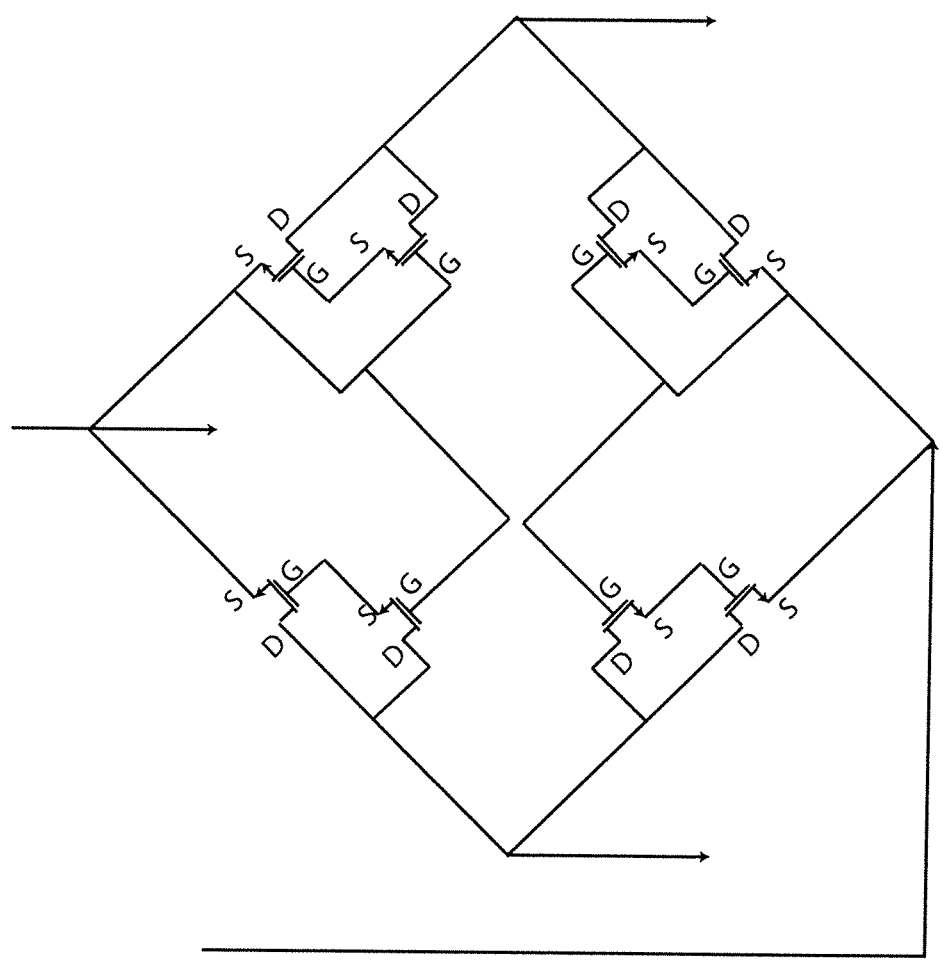
FIG. 12 shows the details of FIG. 1. The block diagram points out the example of an invention implementation which presents the Analog wide bandwidth $2^{nd}$ order Power harvesting detector and complex (I and Q) extractor and compressor, using a depletion Mosfet bridge in specific Darlington Gate 1 Source 2 as well Gate 2 Source 1 relatives short-circuit configuration.

The L outputs requested (optionally a single output) coming out from 16233 block are sent to 17034 stage of FIG. 10. Here are converted into the proper standard format required. In the case at hand, for the sake of simplicity, an optional 17034 modulator is in place, and a D/A converter (17035 block) follows in cascade.

After a proper 17137 follows.

The 17137 block outputs of FIG. 10 are the rebuilding of the $m_l(t)$ expressions, which are the input of HSCS device, subject of the invention (FIG. 1 or FIG. 2.)

Stepped Chirp Continuous Shifted Phase Case: Detailed Implementation Description Input Interface 11000 of FIG. 1

All that has been previously described for the Continuous Chirp Continuous Phase case (see the detailed blocks 11001-11007 in FIG. 2) is valid also for the Stepped Chirp Continuous Phase one.

Complex Generator (I and Q) Expander 12100 in FIG. 1

System generator is implemented in this case with a bench of L*K*M D.D.S. generator devices (see the implementation block diagram of FIG. 3 where L=3, K=1, L=4).

Figure 5:
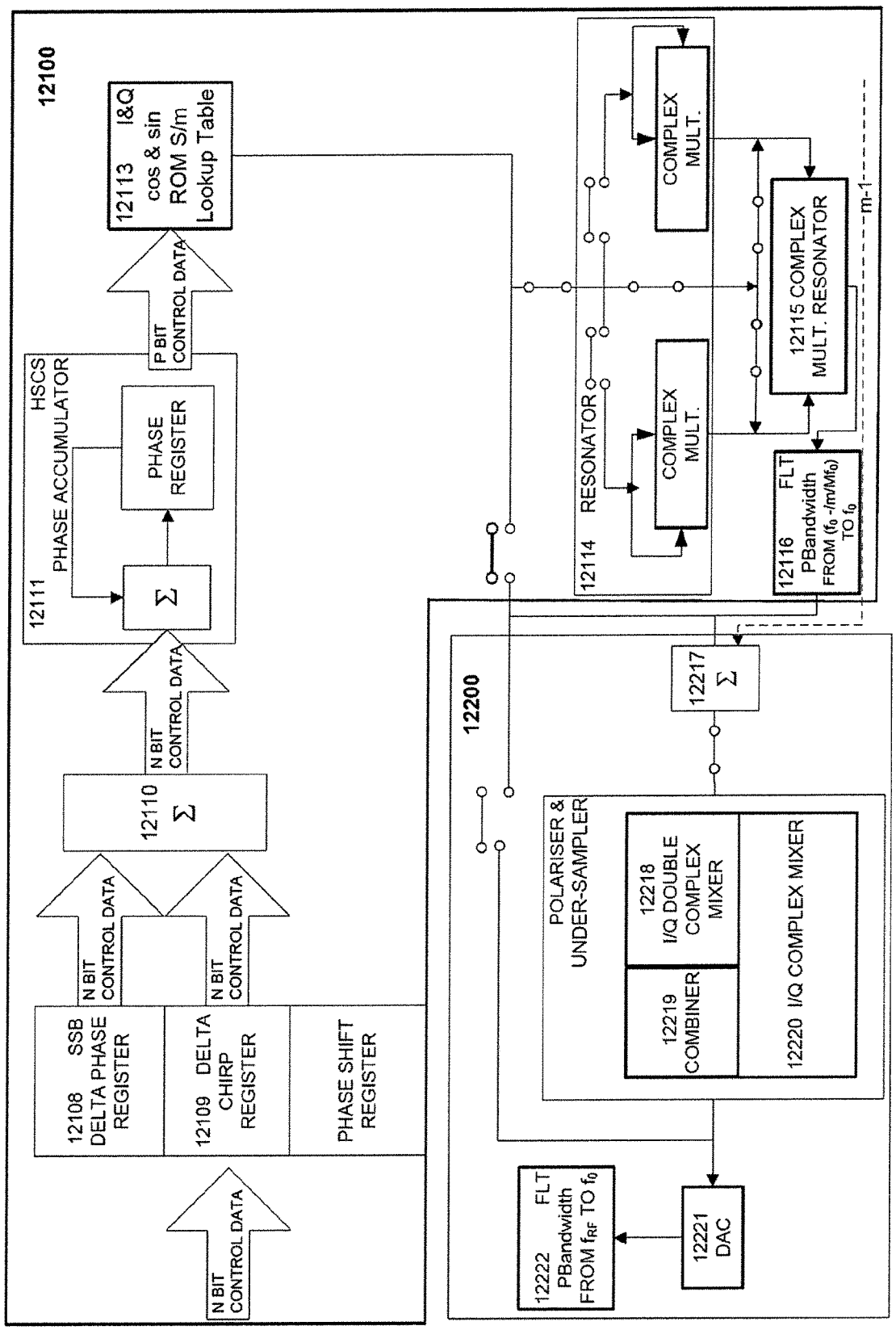
FIG. 5 shows a detail of FIG. 3. The block diagram points out an invention implementation which presents the complex (I and Q) generator (e.g. in the specific case: with a single side band signal, SSB, as carrier), the under-sampler and transducer, related to the lkm-th signal synthesis in the specific case, "b": stepped chirp-continuous phase.

FIG. 5 shows a specific detailed development of a lkm-th single elementary DDS generator.

The lkm-th "Register data control" related to each l-th $m_l(t)$ output signal of 11007 block of FIG. 2, simultaneously enter the registers 12108 and 12109 blocks of FIG. 5, of the corresponding DDS having l, k and m indexes. As an alternative, the generator control data can be directly supplied as input of the generator registers without going through the interface block.

Each of the 12100 generators (see FIG. 3) is realized as a D.D.S. and it is highlighted in FIG. 5. The l-th control data corresponding to the $m_l(t)$ signal, coming from the input interface, entering the HSCS system invention, is essential to digitally synthesize the $S_l(t)$ signal with an assigned frequency $f_{RFl}$. $S_l(t)$ is composed by a $f_0$ carrier and $m_l(t)$ modulating, with any appropriate modulation required, according to the specific application of the invention. In the example here the $S_l(t)$ carrier is generated as a single side band, SSB.

The specific carrier information lkm-th "Register control data" assigned by the invention are collected by 12108 block, here e.g. the "SSB delta phase".

The "chirp delta phase" specific information lkm-th "Register control data", assigned by the invention, is collected by 12109 block. The "Register control data" is used to synthesize the lkm-th chirp signal into the DDS of the invention.

Each lkm-th chirp signal is $f_0$ correlated and it is produced by a $S_l(t)$ carrier having a frequency of $f_{RF}$ defined by the invention for a period $T=T_0$.

In 12109 stage the following values are set:
slope $\mu_{lkm} = \pi[(l-1)+k/K](f_0-f_{BBl}/T_0$
initial phase $\phi_{loss} = 0$ This chirp modulation causes $S_l(t)$ a frequency linear shift of $\Delta f_{lkm} = [(l-1)+k/K] (f_0-f_{BBl})$.

The value of $\Delta f_{lkm}$ is established by HSCS invention method, and e.g. it is computed using a MatLab code program.

The whole process of direct digital synthesis, is implemented by the invention, providing a clock frequency of $f_{cK}$, the same one of all LKM expressions of HSCS, $S_{lkm}$.

12108 and 12109 stages outputs enter the combiner (see stage 12110 of FIG. 5).

The 12110 block output of data added together are sent to 12111 block, which represents the invention phase accumulator.

Therefore, based on the data provided by 12108 and 12109 stages, each lkm-th phase accumulator 12111 outcomes the incremental phase value to be sent to 12113 block which is a "look up table".

For every clock pulse, stage 12113 synthesizes a pair of digital sample, a real part I and an orthogonal imaginary part Q, of an assigned complex periodic function.

Please note that the accumulator input data bit number is N (where N is conveniently selected in order to achieve the resolution on the basis of the assigned frequency).

In turn, stage 12111 has a data bit number=P≤N as output.

The pair related to the 12113 block output digital signal $S_{lkm} = S_{lkm}[f_{RF}, \psi_{lkm}(lf_0; l\phi; m)]$, enters 12115 block.

12115 block is a linear phase modulator that produces the lkm-th I and Q pair $f_0$ related.

The lkm-th pair is the sub mode component having 3LKM unit vectors of the sequence.

The stage 12115 performs an algebraic model multiplier tuned to $f_{RF}$. Each element of the I & Q pair is auto-correlated by the resonant stage 12115. In the stage 12115 each one of the two identical replicas of each I & Q pair, entering the two input stage, is modulated by other simultaneous one.

The I and Q pair output from 12115 block enters a digital low-pass filter FIR 12116. For example, a filter with $f_{1dB} = f_0 - f_{BBl}[(l-1)+k/K]$. is in charge of harmonic suppressing having $f > (f_0 - f_{BBl})[(l-1)+k/K]$ frequency, which is typical of the l-th sequence couple I and Q.

The 12115 output represents a direct synthesis of a signal, $S_{lkm}(t)$, linearly modulated both in phase (linear Shift) and in frequency (chirp). $S_{lkm}(t)$, generated by the invention, is provided with a real part I and with an imaginary part Q squared. $S_{lkm}(t)$ is related to $f_0$ frequency and turns out to be orthogonal to all the other (LKM-1) similarly synthesized by the invention (FIG. 3).

The output generated by the two identical filters (I and Q) 12116 are synchronous signals (apart from a little phase error ε proportional to $f_{BBl}/f_0$) algebraically represented by a linear combination having lkm order compared with a fundamental frequency $f_{RFl}$.

Complex Under-Sampler 12200 of FIG. 1

All that has been previously described for the Continuous Chirp Continuous Phase case is valid also for the Stepped Chirp Continuous Phase one (see the FIG. 5).

Emitter Transducer 13000 FIG. 1

All that has been previously described for the Continuous Chirp Continuous Phase case is valid also for the Stepped Chirp Continuous Phase one (see the FIG. 1)

Figure 6:
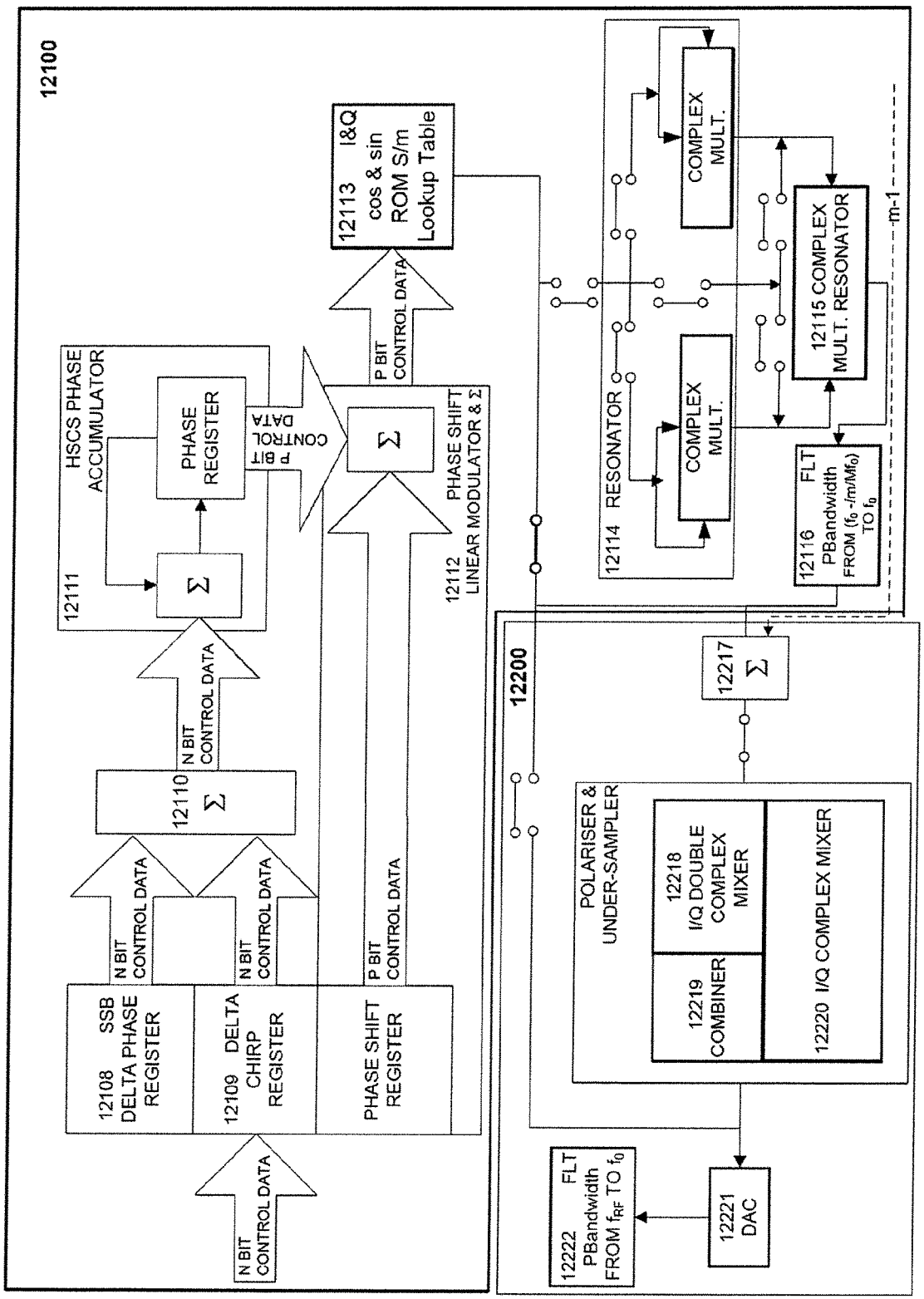
FIG. 6 shows a detail of FIG. 3. The block diagram points out an invention implementation which presents the complex (I and Q) generator (e.g. in the specific case: with a single side band signal, SSB, as carrier), the under-sampler and transducer, related to the lkm-th signal synthesis in the specific case, "c": stepped chirp-stepped phase.

Field, 14000 of FIG. 1
 All that has been previously described for the Continuous Chirp Continuous Phase case is valid also for the Stepped Chirp Continuous Phase one (see the FIG. 1)
Collector Sensor 15000 of FIG. 1
 All that has been previously described for the Continuous Chirp Continuous Phase case is valid also for the Stepped Chirp Continuous Phase one (see the FIG. 1)
Complex Extractor 16000 of FIG. 1, $HSCS_L^{-1}$
 All that has been previously described for the Continuous Chirp Continuous Phase case is valid also for the Stepped Chirp Continuous Phase one (see the FIG. 8 and FIG. 9)
Output Interface 17000 of FIG. 1
 All that has been previously described for the Continuous Chirp Continuous Phase case is valid also for the Stepped Chirp Continuous Phase one (see the FIG. 10)
Stepped Chirp Stepped Shifted Phase Case: Detailed Implementation Description
Input Interface 11000 of FIG. 1
 All that has been previously described for the Continuous Chirp Continuous Phase case (see the detailed blocks 11001-11007 in FIG. 2) is valid also for the Stepped Chirp Stepped Phase one.
Complex Generator (I and Q) Expander 12100 in FIG. 1
 System generator is implemented in this case with a bench of L*K*M D.D.S. generator devices (see the implementation block diagram of FIG. 3 where L=3, K=1, L=4).
 FIG. 6 shows a specific detailed development of a lkm-th single elementary DDS generator.
 The "Register control data" related to each l-th $m_l(t)$, output of 11007 block of FIG. 2, simultaneously enter the registers (see 12108 and 12109 blocks of FIG. 6) of the corresponding DDS having l, k and m indexes. As an alternative, the generator control data can be directly supplied as input of the generator registers without going through the interface block.
 Each of the 12100 generators (see FIG. 3) is realized as a D.D.S. and it is highlighted in FIG. 5. The l-th control data corresponding to the $m_l(t)$ signal, coming from the input interface entering the HSCS system invention, is essential to digitally synthesize the $S_l(t)$ signal, with an assigned frequency $f_{RFl}$, having $f_0$ carrier and $m_l(t)$ modulating, with any appropriate modulation required, according to the specific application of the invention. Here in the example, the $S_l(t)$ carrier is generated as a "single side band", SSB.
 The "Register control data" specific for the "SSB delta phase" information, assigned by the invention, are dedicated to the invention and are collected by 12108 block. They are used to synthesize a $S_l(t)$ carrier within the DDS of the invention.
 The "Register control data" specific of the "chirp delta phase" information, assigned by the invention, are dedicated to the invention and are collected by 12109 block. The "Register control data" are used to synthesize the lkm-th chirp signal into the DDS of the invention.
 Each lkm-th chirp signal is $f_0$ related and it is produced by a $S_l(t)$ carrier having a frequency of $f_{RF}$ defined by the invention for a period $T=T_0$.
 In 12109 stage the following values are set:
  slope $\mu_{lkm}=\pi[(l-1)+k/K](f_0-f_{BBl})/T_0$
  initial phase $\phi_{loss}=0$
  This chirp modulation causes $S_l(t)$ a frequency linear shift of $\Delta f_{lkm}=[(l-1)+k/K](f_0-f_{BBl})$.
  The value of $\Delta f_{lkm}$ is established by HSCS invention method, and it is computed using a MatLab code program.

The whole process of direct digital synthesis, is implemented by the invention, providing a clock frequency of $f_{CK}$, the same one of all $S_{lkm}$ LKM expressions of HSCS.
 12108 and 12109 stages outputs enter the combiner (see stage 12110 of FIG. 6).
 The 12110 block output data are added together and are sent to 12111 block, which represents the invention phase accumulator. Therefore, based on the data provided by 12108 and 12109 stages, each lkm-th phase accumulator 12111 outcomes the incremental phase value to be sent to 12112 block.
 12112 block collects the "phase shift Register control data" too, which are dedicated to the specific linear phase shift modulation assigned by the method. They are used to synthesize the lkm-th phase shift modulation of the carrier $S_l(t)$ $f_0$ correlated signal with the specific phase shift, $\Delta\phi_{lkm}$, into the DDS of the invention. The invention defines the lkm-th azimuthal incremental phase shift value. E.g. in the case considered in FIG. 5, it is:

$$\Delta\phi_{lkm} = -[(l-1)+\Delta\phi_{lk}](m/M)2\pi = -l[1-(K-k)/K](m/M)2\pi$$

where $\Delta\phi_{lm}$ and $\Delta\phi_{lmk}$ are related to the instantaneous phase linear term of the lkm-th component $S_{lmk}(t)$ and both are computed by the invention method (e.g. using a Matlab code program).
 The 12112 block sums the data related to the output 12111 block with the one collected by its "phase shift Register" section.
 The 12112 block output data are added together and are sent to 12113 block which is a "look up table".
 For each clock impulse, stage 12113 synthesizes a pair of digital samples, one for the real part I and the other for the orthogonal imaginary part Q, of a corresponding digital complex signal of an assigned complex periodic function.
 Please note that the accumulator has a number of bit data N as input from registers (where N is conveniently selected in order to achieve the resolution on the basis of the assigned frequency).
 In turn, stage 12111 has a number of bit data=P≤N as output.
Stepped Frequency Stepped Shifted Phase Case: Detailed Implementation Description
Input Interface 11000 of FIG. 1
 All that has been previously described for the Stepped Chirp Stepped Phase case (see the detailed blocks 11001-11007 in FIG. 2) is valid also for the Stepped Frequency Stepped Phase one.
Complex Generator (I and Q) Expander 12100 in FIG. 1
 All that has been previously described for the Stepped Chirp Stepped Phase case case is valid also for the Stepped Frequency Continuous Phase one (see the FIG. 3 and FIG. 7) considering K=1 or K≥1 and M=1.
Complex Under-Sampler 12200 of FIG. 1
 All that has been previously described for the Stepped Chirp Stepped Phase case case is valid also for the Stepped Frequency Continuous Phase one (see the FIG. 7).
Emitter Transducer 13000 FIG. 1
 All that has been previously described for the Continuous Chirp Continuous Phase case is valid also for the Stepped Chirp Continuous Phase one (see the FIG. 1)
Field, 14000 of FIG. 1
 All that has been previously described for the Continuous Chirp Continuous Phase case is valid also for the Stepped Chirp Continuous Phase one (see the FIG. 1)

E.g., for the Electromagnetic propagation case, the 13000 output expression is:

$$\{EH\} = F\{Re[G_c(\lambda_0)HSCS_{LM}] + ajImm[G_c(\lambda_0)(HSCS_{LM})]\}$$

where:
a=1 if the circular or elliptic {EH} field polarization
a=0 if linear {EH} field polarization
Collector Sensor 15000 of FIG. 1

All that has been previously described for the Continuous Chirp Continuous Phase case is valid also for the Stepped Chirp Continuous Phase one (see the FIG. 1)
Complex Extractor 16000 of FIG. 1, All that has been previously described for the Continuous Chirp Continuous Phase case is valid also for the Stepped Chirp Continuous Phase one (see the FIG. 8 and FIG. 9)
Output Interface 17000 of FIG. 1

All that has been previously described for the Continuous Chirp Continuous Phase case is valid also for the Stepped Chirp Continuous Phase one (see the FIG. 10)

Analog Wide Frequency Bandwidth Power Transferring and Harvesting: Detailed Implementation Description
Input Interface 11000 of FIG. 1

All that has been previously described for the Continuous Chirp Continuous Phase or Continuous Chirp Stepped Phase or Stepped Chirp Stepped Phase or Stepped Frequency Stepped Phase cases (see also the detailed blocks 11001-11007 in FIG. 2) is valid also for the Analog wide frequency bandwidth power transferring one.
Complex Generator (I and Q) Expander 12100 in FIG. 1

All that has been previously described for the Continuous Chirp Continuous Phase or Continuous Chirp Stepped Phase or Stepped Chirp Stepped Phase or Stepped Frequency Stepped Phase cases is valid also for the Analog wide frequency bandwidth power transferring one (see the FIG. 3 up to FIG. 7) considering K=1 or K≥1 and M=1.
Complex Under-Sampler 12200 of FIG. 1

Figure 7:
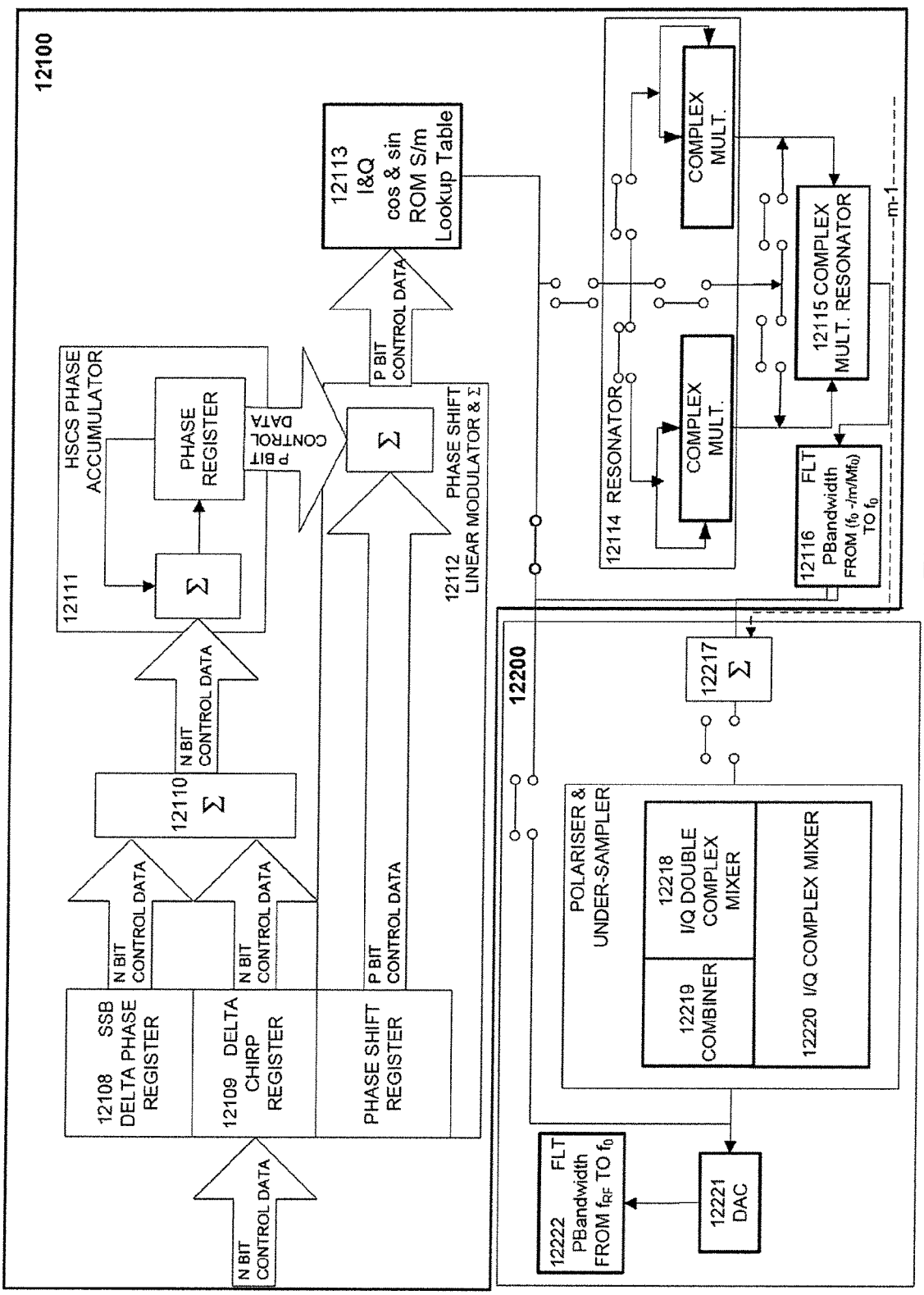
FIG. 7 shows a details of FIG. 3. The block diagram points out an invention implementation which presents the complex (I and Q) generator (e.g. in the specific case: with a single side band signal, SSB, as carrier), the under-sampler and transducer, related to the lkm-th signal synthesis in the specific case, "d": stepped frequency-stepped phase.

All that has been previously described for the Continuous Chirp Continuous Phase or Continuous Chirp Stepped Phase or Stepped Chirp Stepped Phase or Stepped Frequency Stepped Phase cases is valid also for the Analog wide frequency bandwidth power transferring one (see the FIG. 7).
Emitter Transducer 13000 FIG. 1

All that has been previously described for the Continuous Chirp Continuous Phase or Continuous Chirp Stepped Phase or Stepped Chirp Stepped Phase or Stepped Frequency Stepped Phase cases is valid also for the Analog wide frequency bandwidth power transferring one (see the FIG. 1)
Field, 14000 of FIG. 1

All that has been previously described for the Continuous Chirp Continuous Phase or Continuous Chirp Stepped Phase or Stepped Chirp Stepped Phase or Stepped Frequency Stepped Phase cases is valid also for the Analog wide frequency bandwidth power transferring one (see the FIG. 1).

E.g., for the Electromagnetic propagation case, the 13000 output expression is:

$$\{EH\} = F\{Re[G_c(\lambda_0)HSCS_{LM}] + ajImm[G_c(\lambda_0)(HSCS_{LM})]\}$$

where:
a=1 if the circular or elliptic {EH} field polarization
a=0 if linear {EH} field polarization
Collector Sensor 15000 of FIG. 1

All that has been previously described for the Continuous Chirp Continuous Phase or Continuous Chirp Stepped Phase or Stepped Chirp Stepped Phase or Stepped Frequency Stepped Phase cases is valid also for the Analog wide frequency bandwidth power r transferring one (see the FIG. 1).
Complex Extractor 16000 of FIG. 1, $HSCS_{LM}^{-1}$ Continuous Chirp Continuous Phase o Continuous Chirp Stepped Phase or Continuous Chirp Stepped Phase or Stepped Chirp Stepped Phase or Stepped Frequency Stepped Phase cases is valid also for the Analog wide frequency bandwidth power transferring one (see figures from 11 up to FIG. 14)
Output Interface 17000 of FIG. 1

All that has been previously described for the Continuous Chirp Continuous Phase or Continuous Chirp Stepped Phase or Stepped Chirp Stepped Phase or Stepped Frequency Stepped Phase cases is valid also for the Analog wide frequency bandwidth power transferring one (see the FIG. 10)

Description of a Code Program Tool for Invention Method Parameters Computation

The program (eg. in Matlab code) used to compute the method parameter, according to the invention, is valid for all the implementation environments considered above (see FIG. 15 up to FIG. 18). It simulates the mathematical model of the invention. It makes possible to set and optimize the invention implementation design parameters depending on the the value input: L, K, M, $f_0$ and $f_{CK}$.

Following the computed system HSCS design parameters, according to the invention: the elementary spherical spatial phase increment, $\psi_0(M; f_0; \phi_0)$; all the lkm-th vectors coefficients; all the lkm-th spherical spatial phase increments, $\psi_{lkm}(lf_0; l\phi; k; m)$; all the lkm-th azimuthal spatial phase increments, $\Delta\phi_{lkm}$; all the lkm-th tilt spatial phase increments, $\theta_{lkm}$.

Furthermore, if required, the tool emulates the complete emitter subsystem $HSCS_{LKM}$. For instance, for the electromagnetic case, the tool computes the Poynting Vector and the specific OAM.

The single resulting complex signal, generated by the invention, identifies a specific three-dimensional (3-D) complex vector space and 3LKM unit vectors, algebraically represented by the invention. e.g. as a general linear combination like:

$$PP^0(j\omega) = \Sigma_{l=1}^L \Sigma_{k=1}^K \Sigma_{m=1}^M S_{lkm} = \Sigma_{l=1}^L \Sigma_{k=1}^K \Sigma_{m=1}^M C_{LMSlkm} \exp[-j\psi_{lkm}(lf_0; l\phi; k; m)].$$

In the electromagnetic (EH) case eg., the tool computes the Poynting Vector in every related complex vector space EH field point, then in every propagation axis point too. That is possible simply solving the Maxwell equations with respect of the block 12200 (FIG. 3) output expression and imposing the invention specific surrounding conditions to obtain $G_e(\lambda_0)*HSCS_{LKM}$. Both E and B fields belong to the algebraic function $PP^0(j\omega)$ (like the linear combination defined before). The generated $E(PP^0(j\omega))$ and $B(PP^0(j\omega))$ fields represent the required general complex radiation TEM, non-TEM or Divergent assigned modes by the invention. Once computed, or detected by the invention method, the x, y, z values related to $E(PP^0(j\omega))$ and $B(PP^0(j\omega))$, then it is possible, as well known in Physics, for every point ($\forall P$ also on the propagation axis) to compute: the Poynting Vector, the specific Linear Moment and OAM values.

Properties of the Invention

The HSCS of the invention system generates an 3LKM dimensional algebraic Hilbert space with 3LKM unit vectors. The complex vector space is characterized by an L independent limited occupied frequency bandwidth, $BW_0$.

In the most general case, the HSCS complex vector space generated by the invention is characterized by 3LKM complex component vectors. All of them are:
- each other orthogonal
- related to a single central frequency typical of the resultant apart a smallest phase error ε belonging to $\omega_{si}/\omega_0$ ratio.

Each Complex Vector is Provided with:
- a spatial spheric phase $\psi_{lkm}(lf_0; l\phi; k; m)$ assigned by the invention and to which corresponds a characteristic spatial azimuthal phase $\Delta\phi_{lkm}$ and a tilt spatial pahse $\theta_{lk}$. Those phases are detected by HSCS depending exclusively on l, k and m indexes (in addition to $f_0$, and $f_{BBl}$).
- The partial derivative of the first order of the spatial speric phase both for t and z (wave propagation axis) turns out to be null, in other words it does not belong to t not to z, actually $\forall$t and $\forall$z $\partial \psi_{lkm}(lf_0; l\phi; k; m)/\partial$ z=constant and furthermore $\partial \psi_{lkm}(lf_0; l\phi; k; m)/\partial$ t=constant (if the event occurs in an homogeneous medium).
- $\psi_{lm}(lf_0; l\phi; k; m)$ is not variant along propagation axis z as well as with respect to time.

Once provided specific $f_{cK}$, L, K and M which are assigned by the invention method with the requested $f_0$, the HSCS system allows:
- No Processing Gain losses
- Processing Gain exclusively proportional belong to L, K and M.
- Channel Capacity gain proportionally increasing with the L, K and M values.

Such gains occur because the system is capable to process also the longitudinal component power (or informative) contributions (originated by not zero value of $\partial E/\partial z$ as well as $\partial H/\partial z$). As well known in technical literature the last mentioned properties should be impossible to achieve with former invention method.

The invention HSCS develops a field that, e.g. in the electromagnetic, is equipped with assigned OAM for any required value of:
- L Number, and/or central frequency, and/or occupied frequency band $BW_0$, and/or transducer physical dimension and topology, and/or sensor in use.

Such OAM is stable, invariant and differs from zero independently of:
- Time
- Distance between the two blocks 13000 and 15000 of FIG. 1.

The actual channel capacity (setting, for instance for the easiest case: K=M=1) provided by the invention method HSCS, $C_{HSCS}$, as well known in technical literature, is computed by the expression:

$C_{HSCS}=2(L)BW_0.$

Provided the same available bandwidth, $BW_0$, the channel capacity $C_{HSCS}$ is greater than the one $C_{BW_0}$, allowed by former invention systems. As a matter of fact, $C_{HSCS}>C_{BW_0}=2BW_0$, furthermore $Lim_{per\ L\to\infty} C_{HSCS}=\infty$.

The last expression guarantees that invention method generates a whole defined and algebraically continuum system, which is valid in an unlimited complex scalar as well as vector space.

The HSCS structure, both algebraic and implemented, does not present any singularity species, neither at its extreme, nor along its boundary.

Therefore, HSCS generated by the invention is a continuum at the infinite and along the assigned complex vector space longitudinal axis. On the contrary, in the former invention methods, it is impossible to achieve that last property.

Such complete HSCS system generated by the invention, transfers the power which is allocated using L orthogonal vectors. The L orthogonal vectors frequency bandwidth $BW_{RF}$ of complex vector resultant is equal to the maximum independent one, $BB_l$, related to the L input signals 1=1, ..., L, $BW_{RF}=\max[BB_l]$.

Therefore, the L≥1 orthogonal complex mode resultant occupies a frequency bandwidth, $BW_{occupied}\leq BW_{RF}\leq BW_0$, while the utilized actual bandwidth, $BW_{effective}$, effective, according to the invention method is always greater than the resultant one $BW_{occupied}$:

$BW_{effective}=\Sigma^L_{l=1}BB_{Sl}>BW_{occupied}$

It is to be underlined that such performances, which would be impossible to achieve without our invention, increase the efficiency of:
- the Transfer channel
- the Store space
- the Signal
  - sent out across a link
  - Radiated towards any natural physical phenomena (i.e., atmospheric or climatic ones or else) in order to create an interference leading to an adequate control action.

Furthermore the invention method implementation, as high efficiency $2^{nd}$ order wide frequency bandwidth power channeling and energy harvesting directly generates voltaic energy. It directly converts the available harvested energy, the one related to any TEM+DEM $1^{st}$ order linear moment (LM) and Angular moment (AnM) (Electromagnetic, acoustic, gravitational, thermodynamics, pressure, optic, mechanic) detected along the wave propagation axis. As well-known AnM spherical spatial $2^{nd}$ order wave beams power is about 80 dB greater than LM azimuthal spatial $1^{st}$ order waves or wave beams.

The invention method allows to direct detect a Black Hole Gravitational signals with a $2^{nd}$ order visibility degree>½. Usually the gravitational signal intensity is about $10^{-22}$. As well-known in literature, the complex mutual (in a space-time domain) coherence measurement of such Gravitational wave requires to analyze an extremely short bandwidth (in the ideal case it is =0), and an instantaneous time resolution, τ, that in the most favorable case, turns out to be inversely proportional to the square frequency observed bandwidth value ($BW_0$) or the wave coherence period, $\tau_0$. Such direct measurement especially when $\tau>>\tau_0>1/BW_0$ could be impossible using any former method, because its $1^{st}$ order visibility degree<<½.

The invention method allows to allocate or to measure any generated not zero resultant Poynting vector value along propagation axis of any twisted swirling field equipped with complex TEM, non-TEM, or divergent mode too.

The complex vector space is immune from any possible interferometry error due to destructive planar (2-D) interferences. Actually each of all its orthogonal complex 3LKM-D vectors components is equipped with one characteristic orthogonal spherical (3-D) spatial (time invariant) phase, $\psi_{lkm}(lf_0; l\phi; k; m)$.

The invention method has three degrees of freedom available to set $\psi_{lkm}(lf_0; l\phi; k; m)$. Such degrees of freedom are: the fundamental frequency $f_0$; the lkm-th frequency mode $lf_0=f_{lkm}$ (or tilt plane θ); the azimuth spatial phase $l\phi=\Delta\phi_{lkm}$ (or azimuth plane $\phi$). Then, because of its 3-D spatial phase, $\psi_{lkm}(1f_0; l\phi; k; m)$, the invention method is immune from destructive planar phase ambiguity.

Such design three degrees of freedom available are the ones requested, and sufficient, to guarantee the generation of the LKM complex vectors space component being:
- 3-D spatial orthogonal;
- Each correlated whatever required frequency value $f_0$;
- Each extractable without processing method losses.

On the contrary, the former invention methods and/or systems have less degrees of freedom available (e.g. at the most only: $f_0$ and $l\phi$): thus, they are not able to eliminate planar phase ambiguity with any $f_0$ and $l\phi$ values because they lose the longitudinal component.

The invention method, HSCS, is in the same way efficiently applicable to measure near as well far distance fields, because of its planar interferometry error immunity.

The operator, according to the invention, develops both linear and quadratic, spherical wave time—spatial (mutual) phases equation terms. Such terms are originated setting or detecting both spherical wave phases first and second time space derivatives. They contribute to generate the required complex or eventually full imaginary 3LKM-D TEM, non-TEM, or Divergent spherical (3-D) modes which satisfies the wave equation with a "Paraxial approximation". Usually former methods neglect such terms as well as the longitudinal modes components.

The invention HSCS performs a greater approximation degree because it processes the complex or full imaginary OAM mode which are neglected or ignored by all the former invention methods. In Physics literature, such specific modes are well known as non-TEM, or Divergent mode [Electromagnetic (DEM) or Electrical (DE) or Magnetically (DM) Polarization].

As well known in technical literature, all the last-mentioned properties should be impossible to be achieved at once with the former invention methods and/or systems (see ref. [10] and [13]).

HSCS is applicable for any periodic complex function with frequency $f=f_0$ which is included into a Low Frequency and Millimeter Wave (MMW) range interval.

HSCS is applicable for any guided or free light or laser light (e.g. Laguerre Gaussian Beam model) propagation space.

HSCS is applicable for any guided or free EM wave propagation Rx/Tx system, which TEM field is or not equipped with OAM and whatever polarization (e.g. "twisted and/or skewed" and/or Rx polarization different from Tx one).

HSCS is applicable for any guided or free EM wave propagation Rx/Tx system, which non-TEM TE or TM complex field mode are equipped with longitudinal not zero E or M component.

HSCS is applicable for any guided or free EM wave propagation, which divergent complex or full imaginary field mode are equipped with different Rx polarization kind compared with the Tx one.

HSCS is applicable for any "base band" electric signal.

HSCS is applicable for any signal which has been whatever modulated. E.g. as following:
- Analog modulation: AM, PM, FM;
- Digital modulation: QPSK, MSK, and so on . . . ;
- TDM, FDM;

HSCS develops systems for: information signal OAM modulation and de-modulation (mode-demod), from both base band and already up converted.

HSCS develops systems for: Spread Spectrum (SS) modulations, e.g. "Direct sequence" (SS-DS), see ref. [1].

HSCS develops a complex scalar function describing the distribution of a twisted field amplitude which satisfies the wave equation applicable to light and/or laser beam. It could be one of the following:
- Pseudo Gaussian
- Spherical
- Hyperboloid Such distribution is developed independently by the topological characteristics of the specific sensor.

The method of the invention, e.g. by single contemporaneously observation of the frequency wide spectrum of each one of the array antennas, develops a three-dimensional, 3-D, Early universe "Tomographic interferometer process" with 3LKM unit vectors. Such Early universe quadratic order radio telescope observation turns out to be without planar (azimuth) phase error and ambiguity. Therefore, it is full compliant with the requirements of the innovative quadratic models used in the Astrophysics research post processors new generation, which elaborate the data from radio telescope observation.

The method of the invention, besides the space requirement, power consumption and costs decrease, empowers the radio telescope performances efficiency. On the contrary all the last-mentioned properties should be impossible to achieve with former methods and/or systems preceding the invention.

Invention Advantages and Applications

Following some examples of invention applications:
1. Application example of Collector subsystem for detection, observation and measure of radiation coming from any evenly bodies, see ref. [13], which are far hundreds of billions of head and shoulders above us. Here as e.g. is considered the invention application specific case in Square Kilometer Array (SKA) program. In that case, HSCS according with the invention method, uses its ability to correlate and process, in a single concentrated local processor, both the linear and orbital angular momentum in order to extract the requested tomography information data from the whole early universe radiation frequency spectrum (for SKA mission: from the low "band one" 50 MHz up to the highest "band five" frequency, 25 GHz), which is detected by whatever single assigned local % tuned antenna of the SKA antennas arrays stations. On the contrary all the lasts mentioned properties should be impossible to achieve with former SKA methods and/or systems preceding the invention. $\lambda_0$ is assigned according the invention method. In this case the invention method performs a 3LKM unit vectors interferometry process which allows an early universe tomography without planar phase (both azimuth and tilt) or planar ambiguity detection (destructive multi path or Doppler, etc., that are eventually highlighted by grating lobes increasing or by a very low mutual visibility degree value, $<\frac{1}{2}$).

Such 3-D "Early Universe Tomography" approximation order, according with the invention, is quadratic. That is why it is compliant with the innovative last generation quadratic numerical simulator research models, which are already available to elaborate the data from astrophysics SKA observations to reconstruct a required coherent early universe scale. In that example the method of the invention, in addition to the decreased dimension, power consumption and costs, is capable to improve the SKA radio telescope performances efficiency. The efficiency improving factor is proportional to the following values:

LKM

A Saved Antennas (not used) composing the array which, therefore, might be used for other missions or services.

On the other end all the last mentioned properties should not be achieved with former methods and/or systems preceding the invention.

2. Application example of emitter subsystem e.g. for weather and hurricanes forecasts, prevention and control. Here is a selection of a suitable number of frequencies, e.g. N (N is a integer number$\neq \infty$) $f_n$ (with n=1, ..., N). N and $f_n$ are selected based on statistical analysis of previous opportune climatic observations, preferably developed according to the invention Extractor sub system (above) too.

An emitter sub system according with the invention here develops a required radiation composed by LKM (or NLKM) pressure waves. Each one is characterized by a central frequency value $f_0$ (or $f_n$) and opposite phase value respect to the phase one of the LKM (or NLKM) statistical previously observed e.g. with the invention method. The intensity, the central frequency, and the spatial phase characterizing each LKM (or NLKM) component radiation conveniently emitted by HSCS according with the invention allows a softening action on the physic natural components before statistically selected which possibly are present. Such radiated LKM (or NLKM) components may invert the natural event (here is considered e.g. Hurricane event) by softening its action depending on the values assigned to N, L, K, and M which are separately or assembly used to implement the N subsystems, according with the invention. Such implementation method is the same of electromagnetic case, except for introducing a specific electric/pressure signal transducer rather than electromagnetic/pressure one.

3. Application example of emitter subsystem e.g. emitter and extraction system for Satellite Communication which is equivalent to the one described to implement EM one with circular polarized transmitter and receiver antennas. The possible suitable different satellite station signals LKM number to be assigned, compared with the ground control one, belongs by specific compatibility and requirements of the spaceship or space orbited station typology. Therefore, it is possible reduce wasteful and eliminate the not required receiving and transmitting satellite channels. The invention method improves sensitivity of former systems preceding the invention too.

4. Setting LKM high value (not acceptable in former systems preceding the invention) the method allows to detect the complex OAM mode included in weak fundamental with real mode far distant radiations which usually should be neglected or lost (as e.g. in Astrophysics radio telescope observations)

5. The invention allows to assign the gauge transverse related to the spherical OAM of the complex field. It allows to improve the energy related the emitted and/or extracted linear moment by a real TEM mode planar system, according with the invention.

6. The invention is applicable to implement systems or models both analogue and digital e.g. in: Physics; Mechanics; Dynamics; Acoustics; Geology; Clinics; Metrology; Interferometry; Meteorology; Astrophysics; Electronics; Radar; Navigation Assistance Services (Space, Atmospheric, Ground, Naval, Satellite); Communications; energy harvesting; Optoelectronics; Bio-Medical and Bio-Engineering; Monitoring; Security; Civil; industrial, military, data transmission; numerical data and/or video and/or audio signals compression and spreading in any multi points link multi ends emitters and users.

7. The invention allows observation and measurement of the partial second time derivative of all the variable describing any physic complex event which occurs in any environment. On the contrary all the lasts mentioned properties should be impossible to achieve with former methods and/or systems preceding the invention.

8. Furthermore, the invention method allows opportunities to open new applications fields e.g. the following:
   I. Nuclear Physics;
   II. Gravitational Physics;
   III. Energy harvesting;
   IV. Nuclear Fusion "clean energy" generation;
   V. Sustainable nuclear not radioactive nuclear energy;
   VI. Astrophysics see ref.[13];
   VII. Medicine, e.g. in DNA particles computation;
   VIII. Wing Power in nautical as well in aeronautics (e.g. that occurring in high vortex state or located into so called "Wing vortex extremity").
   IX. Dynamics Fluidity of ships outline in Navigation as well in Aeronautics;
   X. Eco environment and climatology: prevention measurements and control of macro and micro climatic and meteorological phenomena due to vortex motions. E.g.: pressure wave and air masses or magmatic fluid or solid mass motions (earthquakes, Vulcans, landslide, tornado, whirlwind, etc.)
   XI. Geology: pressure quadratic variation measuring in order to prevent ground earthquakes and landslide;
   XII. Data compression to memories storing;
   XIII. Communication: channelization and storage of any analogue and digital data information signal as well as the resultant channelization of a multi sub channelization components developing according with the invention both physically and numerically.

9. Application example as electric wide frequency bandwidth wave beam Power generator, transmission, energy harvesting and converter, HSCS system is implemented using: the Analogic wide frequency bandwidth $HSCS_{LKM}$ transform operator configuration of the invention as power transmitter shown in figures from 1 to 7, and the Analogic wide frequency bandwidth $HSCS_{LKM}^{-1}$ as power extractor and voltaic converter shown in figures from 10 to 15.

10. Application example as electric Analogic wide frequency bandwidth Power extractor and converter, HSCS system is implemented using simply: the Analogic $HSCS_{LKM}^{-1}$ as power extractor and voltaic converter shown in figures from 10 to 15. Such configuration is valid to extract and convert and or measure any typology of linear (LM) and/or quadratic ($2^{nd}$ order AOM) energy (electromagnetic, and/or gravitational, and/or thermodynamic, and/or mechanics, and/or optic, and/or etc. ... ). Such $HSCS_{LKM}^{-1}$ invention implementation named $2^{nd}$ order-Wave-Volt converter allows to an 80 dB efficiency gain value greater than the former method one.

11. Application example as $2^{nd}$ order Bio-power frequency meter and/or $2^{nd}$ order Bio-impedance meter to perform any kind of human health check about: blood, hart, lang, DNA, RNA, tumor or cancer cells, etc. ... In such application, according to the invention are to use both the invention operators: the transform operator $HSCS_{LKM}$ (as reference radiation generator) and the anti-transform operator $HSCS_{LKM}^{-1}$ (as power spectrum meter).

12. Application example as $2^{nd}$ order Seismic sensor, according to the invention, is to use the anti-transform operator $HSCS_{LK}M^{-1}$ (as power spectrum meter).
13. Application example s $2^{nd}$ order Thermodynamic sensor for example in Meteo phenomena control and/or prevention such as Hurricane, is to use, according to the invention, the anti-transform operator $HSCS_{LKM}^{-1}$ (as power spectrum meter). It allows a time spatial analysis of any environmental observed event complex $2^{nd}$ order 3-D mutual visibility.
14. According to the invention $HSCS_{LKM}$ performs a radio electromagnetic health therapy system. It radiates any short bandwidth at any extremely high wave beam frequency at any time-space (period-distance) value.
15. Application example as $2^{nd}$ order gravitational time-space wave beam detector system for black hole analysis and studies applications. In such cases, as in Ligo (USA) or VIRGO (Italy), is to be used the full HSCS system composed by both the invention transform operator $HSCS_{LKM}$ and anti-transform operator $HSCS_{LKM}^{-1}$. Such system performs a required time space high frequency and extremely short bandwidth wave beam radiation as well as detects the time space $2^{nd}$ order complex 3-D visibility of observed physic event
16. Application example as $2^{nd}$ order gravitational time-space wave beam direct detector system. As well-known gravitational wave beam intensity is about 10e-22 eV. Such value is extremely weak vs. space noise. In that case, according to the invention is to use the anti-transform operator $HSCS_{LKM}^{-1}$. It detects both the first and second time space derivatives of spherical (3-D) spatial phases (azimuth and tilt) related to the observed gravitational 3-D wave beam. It allows to extract a complex $2^{nd}$ order mutual visibility using any requested sample rate to independently analyze any frequency bandwidth in any coherence period (generally is requested a very long coherence period)

Invention Feasibility

The present invention feasibility occurs because of the following.

First of all, a suitable "very large scale integration (VLSI) technological state of art is already available which is useful to implement present invention method. E.g. innovative and consolidate architectures and microelectronic numerical synthesis techniques are already available to develop generalized form of the transfer function algorithms according to the invention. Such architectures are possible because the state of art of ASIC as well FPGA as well GPU technology.

In addition to that, there are available programmable and reconfigurable mixed signal ASIC technology tools innovative architecture and numerical technique in order to process very high speed (MMW) complex periodic functions and signals.

Invention Applicability Limits

The invention method generates and processes infinites Hilbert algebraic spaces, I valid for every L value integer number comprised in $[1; \infty]$ interval, for every K value integer number comprised in $[1; \infty]$ interval, for every M value integer number included in $[1; \infty]$ interval. Obviously actual invention applicability limits belong to the trade off between implementation costs and advantages.

Furthermore, the trade off critical point belongs to application typology and environment.

A. E.g. in Emitter (Canalization) and/or Extractor (Universe evenly Bodies Radiations Detection and Measure) System Applicability Belongs:

I. Acceptable LKM signal phase error value due to the respective clock signals mismatching phase.
II. Specific implementation technology (ASIC, FPGA, GPU or other) used to develop the complex modulators (Cirp and linear phase shift). The implementation technology defines optimum clock frequency, data rate, frequency bandwidth, consumption and power dissipation values B. Limits in Data Storing and Compression Belong:
I. Specific implementation technology (ASIC, FPGA, GPU or other) used to develop the complex modulators (Cirp and linear phase shift). The implementation technology defines optimum clock frequency, data rate, frequency bandwidth, consumption and power dissipation values
II. Trade-off between specific temporary and storing memory sizes requested in the different applications. Anyway the canalized data compressing and transferring requires data memories, then invention benefits are a result of a specific case by case trade-off. Furthermore, it is to consider in the receiver the possibility to select or not the interest required channels only.

In both A and B below already it may be considered that the optimum LKM value is: $LKM \leq 10^{15}$ Furthermore, e.g. in specific hurricane climatic control and prevention emitters subsystems (e.g.: Stepped Chirp and Continuous Linear Phase Shift of FIG. 5) it may be considered that the optimum LK value is $LK \leq 10^{15}$ with M value is $M \leq \infty$.

BIBLIOGRAPHY

1. "Spread Spectrum Systems" Robert C. Dixon 1984 Ed John Wiley & Sons, Inc.
2. "Angular Momentum of Electromagnetic Radiation"—Autori: Johan Sjoholm & Kristoffer Palmer—UPTEC F07 056 Examensarbete 20 p April 2007—Autori: Johan Sjöholm Kristoffer Palmer
3. "Encoding many channels in the same frequency through radio vorticity: first experimental test."—Venice, on Jun. 24, 2011—Autori: Fabrizio Tamburinil, Elettra Mari, Anna Sponselli, Filippo Romanato, Bo Thidé, Antonio Bianchini, Luca Palmieri, Carlo G.—35131 Padova, Italy, EU.
4. "Beamforming: A Versatile Approach to Spatial Filtering"—IEEE ASSP MAGAZINE APRIL 1988—Autors: Barry D. Van Veen & Kevin M. Buckeley
5. "Angular momentum of light" A. M. Stewart Research School of Physical Sciences and Engineering, The Australian National University Canberra, Australia 0200. e-mail: andrew.stewart@anu.edu.au
6. "ELECTROMAGNETICS" author: E. J. Rothwell (Michigan State University East Lansing, Mich.); Michael J. Cloud Lawrence Technological University Southfield, Mich.—CRC Press Boca Raton London New York Washington, D.C.
7. "Appunti di Campi elettromagnetici" S. Barbato
8. "Microonde" dispense Prof. M Farina DIE Bioingegneria UNI delle Marche
9. "Waves and Fields in Inhomogeneous Media Chew, W. C.", Van Nostrand Reinhold, New York, 1990.
10. "Orbital angular momentum of light and the transformation of Laguerre-Gaussian laser modes", *Physical Review* A, 45, 11 (2006), pp. 8185-8189 Author: L. ALLEN, M. W. BEIJERSBERGEN, R. J. C. SPREEUW, AND J. P. WOERDMAN
11. "Classical Electrodynamics" J. D. Jackson professor of Physics, University of Illinois 12. "From Maxwell to paraxial wave optics" M. Lax, W. H. Louisell and W. B. MacKnight, Phys. Rev. A11,1365 (1975). Melvin Lax Department of Physics, City College of New York, * New York, York 10031 and Bell Telephone Laboratories, Murray Hill, N.J. 07974
13. "Italian SKA White Book", June 2013, Editors: L. Ferretti & I. Prandoni—On behalf of SKA-Italy WG-Endorsed by Scientific Council-, INAF Press.
14. "Campi Elettromagnetici II" Fabrizio Frezza 2005

The invention claimed is:

1. A method for canalizing and transferring a plurality of input periodic physical signals represented in a time domain, t, by complex functions, $SF_l(t)$, with l=1, L, and L is an integer number comprised in $[1;\infty]$, each occupying an independent frequency band $BB_l=[(f_0-f_{BBl}),f_0]$, wherein $f_0$ is an upper limit of the frequency band and $f_{BBl}$ is a frequency smaller than $f_0$, into a single complex signal, resultant of L orthogonal components each l-th being in bijection with the respective $SF_l(t)$, correlated at a frequency $f_0$ with a single occupied frequency bandwidth having width equal to the largest band among said bands $BB_l$, where $BW_{RF}=\max[BB_l]$, the method comprising the following steps:
   acquiring the input periodic physical signals $SF_l(t)$ and transforming the physical signals into electrical signals via one or more transducers;
   extracting from each electrical signal information content as modulation function $m_l(t)$ having frequency bandwidth $BB_l$;
   performing a Fourier Transform of $m_l(t)$, obtaining a function $m_l(j\omega)$;
   generating, for each function $m_l(j\omega)$, a corresponding periodic digital signal $P_l(j\omega)$ having carrier frequency $f_0$ and function $m_l(j\omega)$;
   generating for each periodic digital signal $P_l(j\omega)$ a pair of signals in quadrature;
   generating for each pair of signals in quadrature K*M pairs of signals $PP_{lkm}(j\omega)$, wherein K and M are integer numbers comprised in $[1;\infty]$ and k=1, ..., K as well as m=1, ..., M, each pair of signals being generated through the following steps:
      performing KM chirp modulations, each of the KM chirp modulations characterized by a corresponding frequency increment $\Delta f_{lkm}=[(l-1)+k/K](f_0-f_{BBl})$, which is the same for each of the M pairs with the same k, in a time interval $\Delta T=T_0$ at a clock frequency $f_{ck}$;
      performing M linear phase modulations for each of K chirp modulations, each of the K*M linear phase modulations characterized by a corresponding phase increment $\Delta\phi_{lkm}=[(l-1)-l(k-1)/K+(lm/M)]2\pi$ at the clock frequency $f_{ck}$;
   under sampling each of K*M pairs of signals $PP_{lkm}(j\omega)$ at a frequency $f_0$ thus obtaining a pair of canalized signals $PP^0_{lm}(j\omega)$ which by construction have a spatial phase (3-D) orthogonal to each of the other (L*K*M−1) signal pairs and are correlated to $f_0$;
   vector summing all the L*K*M pairs of orthogonal $PP^0_{lkm}$ (j$\omega$) components thus obtaining a pair of LKM-dimensional signals $PP^0(j\omega)$ occupying a frequency bandwidth $BW_{RF} \leq f_0$; and
   sending the pair of LKM-dimensional signals $PP^0(j\omega)$ to a signals emitter-transducer tuned to $f_0$, which performs polarization.

2. The method according to claim 1, wherein the vector summing of all the L*K*M pairs of orthogonal $PP^0_{lkm}$ (j$\omega$) components is realized by a simple collection node of all the orthogonal signals produced by under sampling each pair of signals $PP^0_{lkm}(j\omega)$ at a frequency $f_0$.

3. The method according to claim 1, wherein the signals emitter-transducer is a signals transmission media with unitary transfer function.

4. The method according to claim 1, wherein the value of at least one of: M, K and L is infinite, thus obtaining continuous chirps and linear phase modulation components, wherein the vector summing is replaced by vector integral operation.

5. The method according to claim 1, wherein the plurality of input periodic physical signals are subdivided into a plurality of periodic physical signals, to each element of the plurality being applied the steps of the method.

6. The method of claim 1, wherein the input periodic physical signals are at least one of: electrical, electromagnetic, gravitational wave, analog, digital, mechanical oscillations, pressure waves, optical signals, and thermodynamic signals.

7. The method of claim 1, wherein $f_{ck} \geq 2LKMf_0$.

8. A method for the extraction of a plurality of periodic physical signals represented in the time domain, t, by complex functions $SF_l(t)$, with l=1, L, and L is an integer number comprised in $[1;\infty]$, each of which occupies an independent frequency band $BB_l=[(f_0-f_{BBl}),f_0]$, starting from a single complex signal $PP^0(j\omega)$ correlated to a frequency $f_0$ occupying a frequency band $BW_{RF}$ whose width is equal to the largest band among said bands $BB_l$, where $BW_{RF}=\max[BB_l]$, the method comprising the following steps:
   detecting via a sensor tuned to $f_0$, which performs polarization, said single complex signal to obtain $PP^0(j\omega)$ being approximated as $PP^0(j\omega)=\Sigma^L_{l=1}\Sigma^K_{k=1}\Sigma^M_{m=1} PP_{lkm}(j\omega)$, wherein the $PP_{lkm}(j\omega)$ are orthogonal signals in quadrature;
   applying a complex correlation, at frequency $f_0$, to the single complex signal detected by said sensor, thus obtaining LKM pairs of signals $PP^0_{lkm}(j\omega)$;
   performing, for each value of l=1, ... L, KM complex convolutions simultaneously, at a clock frequency $f_{ck}$, of each pair of signals $PP^0_{lkm}(j\omega)$, the KM complex convolutions being configured to extract KM respective chirps with frequency shift $\Delta f_{lkm}=[(l-1)+k/K](f_0-f_{BBl})$ and an azimuth phase delay $\Delta\phi_{lkm}=-l[1-(K-k)/K](m/M)2\pi$, from said pair of signals $PP^0_{lkm}(j\omega)$, in an interval $T_0$, obtaining corresponding pairs of signals with k=1, ... K and m=1, ... M for each l, wherein K and M are integer numbers comprised in $[1;\infty]$;
   summing the KM corresponding pairs of signals for each/value, obtaining independent modulation functions $m_l(j\omega)$ with/varying;
   performing a Fourier Anti-Transform of $m_l(j\omega)$ and thus obtaining corresponding time domain modulation functions $m_l(t)$; and
   transforming the time domain modulation functions $m_l(t)$ into complex functions $SF_l(t)$ by one or more transducers.

9. The method according to claim 8, wherein said single complex signal is the signal emitted by a signals emitter-transducer tuned to $f_0$ which performs polarization.

10. The method according to claim 9, wherein the polarization of the signals emitter-transducer is the same or is different from the polarization of the sensor tuned to $f_0$.

11. A non-transitory computer-readable medium comprising program instructions that, when executed by a computer processing device, causes the computer processing device to:

extract information content from each electrical signal as time domain modulation function $m_l(t)$ having frequency bandwidth $BB_l$;

perform a Fourier Transform of $m_l(t)$, obtaining a modulation function $m_l(j\omega)$;

generate, for each modulation function $m_l(j\omega)$, a corresponding periodic digital signal $P_l(j\omega)$ having carrier frequency $f_0$ and modulation function $m_l(j\omega)$;

generate for each periodic digital signal $P_l(j\omega)$, a pair of signals in quadrature;

generate for each pair of signals in quadrature, K*M pairs of signals $PP_{lkm}(j\omega)$, wherein K and M are integer numbers comprised in [1; ∞] and k=1, ..., K as well as m=1, ..., M, each pair of signals being generated through the following steps:

performing KM chirp modulations, each of the KM chirp modulations characterized by a corresponding frequency increment $\Delta f_{lkm}=[(l-1)+k/K](f_0-f_{BBl})$, which is the same for each of the M pairs with the same k, in a time interval $\Delta T=T_0$ at a clock frequency $f_{ck}$;

performing M linear phase modulations for each of K chirp modulations, each of the K*M linear phase modulations characterized by a corresponding phase increment $\Delta\phi_{lkm}=[(l-1)-l(k-1)/K+(lm/M)]2\pi$ at the clock frequency $f_{ck}$;

under sample each pair of signals $PP_{lkm}(j\omega)$ at a frequency $f_0$ thus obtaining a pair of canalized signals $PP^0_{lm}(j\omega)$ which by construction have a spatial phase (3-D) orthogonal to each of the other (L*K*M−1) signal pairs and are correlated to $f_0$; and vector sum all the L*K*M pairs of orthogonal $PP^0_{lkm}(j\omega)$ components thus obtaining a pair of LKM-dimensional signals $PP^0(j\omega)$ occupying a frequency bandwidth $BW_{RF} \leq f_0$.

12. A system for the canalization and/or extraction of a plurality of physical signals, wherein the system comprises:

acquisition devices of a set of original physical signals;

one or more transducers for the transformation of the set of original physical signals into electrical signals;

a computerized sub-system to process said electrical signals to obtain one or more final electrical signals, the computerized sub-system configured to:

extract from each electrical signal information content as time domain modulation function $m_l(t)$ having frequency bandwidth $BB_l$;

perform a Fourier Transform of $m_l(t)$, obtaining a modulation function $m_l(j\omega)$;

generate, for each modulation function $m_l(j\omega)$, a corresponding periodic digital signal $P_l(j\omega)$ having carrier frequency $f_0$ and modulation function $m_l(j\omega)$;

generate for each periodic digital signal $P_l(j\omega)$, a pair of signals in quadrature;

generate for each pair of signals in quadrature, K*M pairs of signals $PP_{lkm}(j\omega)$, wherein K and M are integer numbers comprised in [1; ∞] and k=1, ..., K as well as m=1, ..., M, each pair of signals being generated through the following steps:

performing KM chirp modulations, each of the KM chirp modulations characterized by a corresponding frequency increment $\Delta f_{lkm}=[(l-1)+k/K](f_0-f_{BBl})$, which is the same for each of the M pairs with the same k, in a time interval $\Delta T=T_0$ at a clock frequency $f_{ck}$;

performing M linear phase modulations for each of K chirp modulations, each of the K*M linear phase modulations characterized by a corresponding phase increment $\Delta\phi_{lkm}=[(l-1)-l(k-1)/K+(lm/M)]2\pi$ at the clock frequency $f_{ck}$;

under sample each pair of signals $PP_{lkm}(j\omega)$ at a frequency $f_0$ thus obtaining a pair of canalized signals $PP^0_{lm}(j\omega)$ which by construction have a spatial phase (3-D) orthogonal to each of the other (L*K*M−1) signal pairs and are correlated to $f_0$;

vector sum all the L*K*M pairs of orthogonal $PP^0_{lkm}(j\omega)$ components thus obtaining a pair of LKM-dimensional signals $PP^0(j\omega)$ occupying a frequency bandwidth $BW_{RF} \leq f_0$;

one or more transducers for the transformation of said final electrical signals into one or more final physical signals; and emission devices for the emission of said one or more final physical signals.

13. The system of claim 12, further comprising a collector subsystem comprising:

sensors for the acquisition of said one or more final physical signals;

one or more transducers for the transformation of the one or more final physical signals into electrical signals;

a computerized sub-system for processing said electrical signals to obtain one or more output electrical signals, the computerized sub-system configured to:

apply a complex correlation, at frequency $f_0$, to the one or more final physical signals detected by said sensors, thus obtaining LKM pairs of signals $PP^0_{lkm}(j\omega)$;

perform, for each value of l=1, ... L, KM complex convolutions simultaneously, at the clock frequency $f_{ck}$, of each pair of signals $PP^0_{lkm}(j\omega)$, the KM complex convolutions being configured to extract KM respective chirps with frequency shift $\Delta f_{lkm}=[(l-1)+k/K](f_0-f_{BBl})$ and an azimuth phase delay $\Delta\phi_{lkm}=-l[1-(K-k)/K](m/M)2\pi$, from said pair of signals $PP^0_{lkm}(j\omega)$, in an interval $T_0$, obtaining corresponding pairs of signals with k=1, ... K and m=1, ... M for each l, wherein K and M are integer numbers comprised in [1; ∞];

sum the KM corresponding pairs of signals for each l value, obtaining independent modulation functions $m_l(j\omega)$ with l varying;

perform a Fourier Anti-Transform of $m_l(j\omega)$ and thus obtaining corresponding time domain modulation functions $m_l(t)$; and one or more transducers for obtaining said set of original physical signals from said one or more output electrical signals.

* * * * *